(12) United States Patent
Beg et al.

(10) Patent No.: US 12,052,071 B2
(45) Date of Patent: Jul. 30, 2024

(54) USING MIMO TRAINING FIELDS FOR MOTION DETECTION

(71) Applicant: Cognitive Systems Corp., Waterloo (CA)

(72) Inventors: Christopher Beg, Kitchener (CA); Mohammad Omer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 447 days.

(21) Appl. No.: 17/321,839

(22) Filed: May 17, 2021

(65) Prior Publication Data

US 2021/0273685 A1     Sep. 2, 2021

Related U.S. Application Data

(63) Continuation of application No. 17/082,456, filed on Oct. 28, 2020, now Pat. No. 11,012,122.

(Continued)

(51) Int. Cl.
*H04B 7/0426* (2017.01)
*G01S 13/56* (2006.01)
(Continued)

(52) U.S. Cl.
CPC .............. *H04B 7/043* (2013.01); *G01S 13/56* (2013.01); *H04B 7/0617* (2013.01); *H04W 84/12* (2013.01)

(58) Field of Classification Search
CPC .......... G01S 7/415; G01S 13/46; G01S 13/56; G01S 13/765; G01S 2013/462;
(Continued)

(56) References Cited

U.S. PATENT DOCUMENTS

| 4,054,879 A | 10/1977 | Wright et al. |
| 4,197,537 A | 4/1980 | Follen et al. |

(Continued)

FOREIGN PATENT DOCUMENTS

| CA | 2834522 | 5/2014 |
| CA | 2945702 | 8/2015 |

(Continued)

OTHER PUBLICATIONS

1 USPTO, Notice of Allowance mailed Jul. 28, 2021, in U.S. Appl. No. 17/318,211, 41 pgs.

(Continued)

*Primary Examiner* — Eric Nowlin
(74) *Attorney, Agent, or Firm* — Henry Patent Law Firm PLLC

(57) ABSTRACT

In a general aspect, various fields of a PHY frame are used for motion detection. In some aspects, a first training field and a second, different training field are identified in a PHY frame of each wireless signal transmitted between wireless communication devices in a wireless communication network. A first time-domain channel estimate and a second time-domain channel estimate are generated for each wireless signal. The first time-domain channel estimate is based on a first frequency-domain signal included in the first training field, while the second time-domain channel estimate is based on a second frequency-domain signal included in the second training field. A determination is made whether motion has occurred in a space during the time period based on the first time-domain channel estimates, and a location of the motion within the space is determined based on the second time-domain channel estimates.

29 Claims, 15 Drawing Sheets

Related U.S. Application Data

(60) Provisional application No. 62/928,684, filed on Oct. 31, 2019.

(51) Int. Cl.
  *H04B 7/06* (2006.01)
  *H04W 84/12* (2009.01)

(58) Field of Classification Search
  CPC ..... H04B 7/043; H04B 7/0617; H04L 5/0048; H04L 25/0204; H04L 25/0212; H04L 25/022; H04L 25/0222; H04L 25/0228; H04W 84/12
  See application file for complete search history.

(56) References Cited

U.S. PATENT DOCUMENTS

| | | | |
|---|---|---|---|
| 4,417,157 A | 11/1983 | Gershberg et al. | |
| 4,636,774 A | 1/1987 | Galvin et al. | |
| 4,649,388 A | 3/1987 | Atlas | |
| 4,740,045 A | 4/1988 | Goodson et al. | |
| 5,270,720 A | 12/1993 | Stove | |
| 5,613,039 A | 3/1997 | Wang et al. | |
| 5,696,514 A | 12/1997 | Nathanson et al. | |
| 6,075,797 A | 6/2000 | Thomas | |
| 6,380,882 B1 | 4/2002 | Hegnauer | |
| 6,573,861 B1 | 6/2003 | Hommel et al. | |
| 6,636,763 B1 | 10/2003 | Junker et al. | |
| 6,914,854 B1 | 7/2005 | Heberley et al. | |
| 7,652,617 B2 | 1/2010 | Kurtz et al. | |
| 7,742,753 B2 | 6/2010 | Carrero et al. | |
| 8,463,191 B2 | 6/2013 | Farajidana et al. | |
| 8,660,578 B1 | 2/2014 | Yang et al. | |
| 8,671,069 B2 | 3/2014 | Chang et al. | |
| 8,710,984 B2 | 4/2014 | Wilson et al. | |
| 8,760,392 B2 | 6/2014 | Lloyd et al. | |
| 8,812,654 B2 | 8/2014 | Gelvin et al. | |
| 8,832,244 B2 | 9/2014 | Gelvin et al. | |
| 8,836,344 B2 | 9/2014 | Habib et al. | |
| 8,836,503 B2 | 9/2014 | Gelvin et al. | |
| 8,934,884 B2 | 1/2015 | Gustafsson et al. | |
| 9,019,148 B1 | 4/2015 | Bikhazi et al. | |
| 9,030,321 B2 | 5/2015 | Breed | |
| 9,161,172 B2 | 10/2015 | Poduri et al. | |
| 9,253,592 B1 | 2/2016 | Moscovich et al. | |
| 9,329,701 B2 | 5/2016 | Lautner | |
| 9,389,085 B2 | 7/2016 | Khorashadi et al. | |
| 9,523,760 B1 | 12/2016 | Kravets et al. | |
| 9,524,628 B1 | 12/2016 | Omer et al. | |
| 9,551,784 B2 | 1/2017 | Katuri et al. | |
| 9,584,974 B1 | 2/2017 | Omer et al. | |
| 9,609,468 B1 | 3/2017 | Moscovich et al. | |
| 9,628,365 B2 | 4/2017 | Gelvin et al. | |
| 9,661,508 B2* | 5/2017 | Siomina | H04B 17/336 |
| 9,692,459 B2 | 6/2017 | Maltsev et al. | |
| 9,743,294 B1 | 8/2017 | Omer et al. | |
| 9,866,308 B1 | 1/2018 | Bultan et al. | |
| 9,869,759 B2 | 1/2018 | Furuskog et al. | |
| 9,927,519 B1 | 3/2018 | Omer et al. | |
| 9,933,517 B1 | 4/2018 | Olekas et al. | |
| 9,946,351 B2 | 4/2018 | Sakaguchi et al. | |
| 9,989,622 B1 | 6/2018 | Griesdorf et al. | |
| 10,004,076 B1 | 6/2018 | Griesdorf et al. | |
| 10,048,350 B1 | 8/2018 | Piao et al. | |
| 10,051,414 B1 | 8/2018 | Omer et al. | |
| 10,077,204 B2 | 9/2018 | Maschmeyer et al. | |
| 10,108,903 B1 | 10/2018 | Piao et al. | |
| 10,109,167 B1 | 10/2018 | Olekas et al. | |
| 10,109,168 B1 | 10/2018 | Devison et al. | |
| 10,111,228 B2 | 10/2018 | Griesdorf et al. | |
| 10,129,853 B2 | 11/2018 | Manku et al. | |
| 10,228,439 B1 | 3/2019 | Olekas et al. | |
| 10,264,405 B1 | 4/2019 | Manku et al. | |
| 10,318,890 B1 | 6/2019 | Kravets et al. | |
| 10,349,216 B1 | 7/2019 | Tran et al. | |
| 10,380,856 B2 | 8/2019 | Devison et al. | |
| 10,393,866 B1 | 8/2019 | Kravets et al. | |
| 10,404,387 B1 | 9/2019 | Devison et al. | |
| 10,438,468 B2 | 10/2019 | Olekas et al. | |
| 10,459,074 B1 | 10/2019 | Omer et al. | |
| 10,459,076 B2 | 10/2019 | Kravets et al. | |
| 10,460,581 B1 | 10/2019 | Devison et al. | |
| 10,498,467 B1 | 12/2019 | Ravkine | |
| 10,499,364 B1 | 12/2019 | Ravkine | |
| 10,506,384 B1 | 12/2019 | Omer et al. | |
| 10,565,860 B1 | 2/2020 | Omer et al. | |
| 10,567,914 B1 | 2/2020 | Omer et al. | |
| 10,600,314 B1 | 3/2020 | Manku et al. | |
| 10,605,907 B2 | 3/2020 | Kravets et al. | |
| 10,605,908 B2 | 3/2020 | Kravets et al. | |
| 10,743,143 B1 | 8/2020 | Devison et al. | |
| 10,805,022 B2* | 10/2020 | Shan | H04B 17/27 |
| 10,849,006 B1 | 11/2020 | Beg et al. | |
| 11,012,122 B1* | 5/2021 | Beg | H04L 25/0212 |
| 11,018,734 B1 | 5/2021 | Beg | |
| 11,184,063 B2 | 11/2021 | Beg | |
| 11,304,254 B2* | 4/2022 | Omer | H04W 76/15 |
| 11,570,712 B2* | 1/2023 | Beg | H04B 7/0413 |
| 2002/0080014 A1 | 6/2002 | McCarthy et al. | |
| 2003/0108119 A1 | 6/2003 | Mohebbi et al. | |
| 2005/0055568 A1 | 3/2005 | Agrawala et al. | |
| 2005/0128067 A1 | 6/2005 | Zakrewski | |
| 2006/0152404 A1 | 7/2006 | Fullerton et al. | |
| 2006/0217132 A1 | 9/2006 | Drummond-Murray et al. | |
| 2006/0284757 A1 | 12/2006 | Zemany | |
| 2007/0036353 A1 | 2/2007 | Reznik et al. | |
| 2007/0296571 A1 | 12/2007 | Kolen | |
| 2008/0007404 A1 | 1/2008 | Albert et al. | |
| 2008/0057978 A1 | 3/2008 | Karaoguz et al. | |
| 2008/0119130 A1 | 5/2008 | Sinha | |
| 2008/0240008 A1 | 10/2008 | Backes et al. | |
| 2008/0258907 A1 | 10/2008 | Kalpaxis | |
| 2008/0300055 A1 | 12/2008 | Lutnick et al. | |
| 2008/0303655 A1 | 12/2008 | Johnson | |
| 2009/0062696 A1 | 3/2009 | Nathan et al. | |
| 2009/0122882 A1* | 5/2009 | Mujtaba | H04L 27/261 375/260 |
| 2009/0180444 A1 | 7/2009 | McManus et al. | |
| 2010/0073686 A1 | 3/2010 | Medeiros et al. | |
| 2010/0127853 A1 | 5/2010 | Hanson et al. | |
| 2010/0130229 A1 | 5/2010 | Sridhara et al. | |
| 2010/0207804 A1 | 8/2010 | Hayward et al. | |
| 2010/0234045 A1 | 9/2010 | Karr et al. | |
| 2010/0306320 A1 | 12/2010 | Leppanen et al. | |
| 2010/0315284 A1 | 12/2010 | Trizna et al. | |
| 2011/0019587 A1 | 1/2011 | Wang | |
| 2011/0035491 A1 | 2/2011 | Gelvin et al. | |
| 2011/0090081 A1 | 4/2011 | Khorashadi et al. | |
| 2011/0148689 A1* | 6/2011 | Filippi | G01S 13/003 342/28 |
| 2011/0260856 A1 | 10/2011 | Rossmann et al. | |
| 2011/0260871 A1 | 10/2011 | Karkowski | |
| 2011/0263946 A1 | 10/2011 | El Kaliouby et al. | |
| 2012/0115512 A1 | 5/2012 | Grainger et al. | |
| 2012/0146788 A1 | 6/2012 | Wilson et al. | |
| 2012/0182429 A1 | 7/2012 | Forutanpour et al. | |
| 2012/0184296 A1 | 7/2012 | Milosiu | |
| 2012/0283896 A1 | 11/2012 | Persaud | |
| 2013/0017836 A1 | 1/2013 | Chang et al. | |
| 2013/0045759 A1 | 2/2013 | Smith | |
| 2013/0090151 A1 | 4/2013 | Ngai et al. | |
| 2013/0094538 A1 | 4/2013 | Wang | |
| 2013/0113647 A1 | 5/2013 | Sentelle et al. | |
| 2013/0162459 A1 | 6/2013 | Aharony et al. | |
| 2013/0178231 A1 | 7/2013 | Morgan | |
| 2013/0208715 A1* | 8/2013 | Roh | H04L 1/0025 370/338 |
| 2013/0283256 A1 | 10/2013 | Proud | |
| 2013/0301451 A1* | 11/2013 | Siomina | H04B 17/336 370/252 |
| 2014/0015706 A1 | 1/2014 | Ishihara et al. | |
| 2014/0073346 A1 | 3/2014 | Yang et al. | |
| 2014/0126323 A1 | 5/2014 | Li et al. | |

(56) References Cited

U.S. PATENT DOCUMENTS

| | | |
|---|---|---|
| 2014/0135042 A1 | 5/2014 | Buchheim et al. |
| 2014/0148195 A1 | 5/2014 | Bassan-Eskenazi et al. |
| 2014/0213284 A1 | 7/2014 | Yang et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0288876 A1 | 9/2014 | Donaldson |
| 2014/0329540 A1 | 11/2014 | Duggan et al. |
| 2014/0355713 A1 | 12/2014 | Bao et al. |
| 2014/0358473 A1 | 12/2014 | Goel et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0350976 A1 | 12/2015 | Kodali et al. |
| 2015/0366542 A1 | 12/2015 | Brown et al. |
| 2016/0014554 A1 | 1/2016 | Sen et al. |
| 2016/0018508 A1 | 1/2016 | Chen et al. |
| 2016/0073060 A1 | 3/2016 | Renkis |
| 2016/0080908 A1 | 3/2016 | Julian et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0178741 A1 | 6/2016 | Ludlow et al. |
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0261452 A1 | 9/2016 | Porat et al. |
| 2016/0262355 A1 | 9/2016 | Swan |
| 2016/0363663 A1 | 12/2016 | Mindell et al. |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086202 A1* | 3/2017 | Chen ............... H04W 72/541 |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195016 A1 | 7/2017 | Alexander et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0257862 A1* | 9/2017 | Xue ..................... H04L 1/0007 |
| 2017/0278374 A1 | 9/2017 | Skaaksrud |
| 2017/0280351 A1 | 9/2017 | Skaaksrud |
| 2017/0311279 A1 | 10/2017 | Allegue et al. |
| 2017/0311574 A1 | 11/2017 | Swan |
| 2017/0325117 A1 | 11/2017 | Li et al. |
| 2017/0343658 A1 | 11/2017 | Ramirez et al. |
| 2017/0359804 A1 | 12/2017 | Manku et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0120420 A1 | 5/2018 | McMahon et al. |
| 2018/0168552 A1 | 6/2018 | Shi et al. |
| 2018/0180706 A1 | 6/2018 | Li et al. |
| 2018/0184907 A1 | 7/2018 | Tran |
| 2018/0270821 A1 | 9/2018 | Griesdorf et al. |
| 2018/0288587 A1 | 10/2018 | Allegue Martinez et al. |
| 2018/0323835 A1 | 11/2018 | Wang et al. |
| 2018/0324815 A1 | 11/2018 | Nammi et al. |
| 2018/0330293 A1 | 11/2018 | Kulkarni et al. |
| 2019/0033446 A1 | 1/2019 | Bultan et al. |
| 2019/0074876 A1 | 3/2019 | Kakishima et al. |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0156943 A1 | 5/2019 | Kocherscheidt et al. |
| 2019/0170869 A1 | 6/2019 | Kravets et al. |
| 2019/0222330 A1* | 7/2019 | Shan .................... H04W 64/006 |
| 2019/0271775 A1 | 9/2019 | Zhang et al. |
| 2019/0272718 A1 | 9/2019 | Hurtig et al. |
| 2019/0294833 A1 | 9/2019 | Lu et al. |
| 2019/0327124 A1 | 10/2019 | Lai et al. |
| 2020/0112939 A1* | 4/2020 | Scharf ................. H04W 64/003 |
| 2020/0150263 A1* | 5/2020 | Eitan ..................... G01S 13/003 |
| 2020/0175405 A1 | 6/2020 | Omer et al. |
| 2020/0178033 A1 | 6/2020 | Omer et al. |
| 2020/0204222 A1 | 6/2020 | Lou et al. |
| 2020/0209378 A1 | 7/2020 | Yokev et al. |
| 2020/0264292 A1 | 8/2020 | Kravets et al. |
| 2020/0271747 A1* | 8/2020 | Wu ......................... G01P 15/18 |
| 2020/0305231 A1 | 9/2020 | Sadeghi et al. |
| 2020/0351576 A1 | 11/2020 | Beg et al. |
| 2020/0351692 A1 | 11/2020 | Beg et al. |
| 2020/0367021 A1 | 11/2020 | Devison et al. |
| 2020/0371222 A1 | 11/2020 | Kravets et al. |
| 2021/0099835 A1 | 4/2021 | Omer |
| 2021/0099836 A1 | 4/2021 | Omer |
| 2021/0099970 A1 | 4/2021 | Omer |
| 2021/0103045 A1 | 4/2021 | Kravets et al. |
| 2021/0135711 A1 | 5/2021 | Beg et al. |
| 2021/0135718 A1 | 5/2021 | Beg |
| 2021/0329554 A1* | 10/2021 | Beg ...................... H04B 7/0413 |
| 2021/0409132 A1* | 12/2021 | Bouttier ............... H04L 25/024 |
| 2022/0070954 A1* | 3/2022 | Omer .................... H04L 5/0053 |
| 2022/0417706 A1* | 12/2022 | Gummadi ............. G01S 5/011 |

FOREIGN PATENT DOCUMENTS

| | | | | |
|---|---|---|---|---|
| CN | 102037667 | | 1/2015 | |
| CN | 111373281 | | 7/2020 | |
| CN | 112955780 A | * | 6/2021 | ........... G01S 13/003 |
| CN | 116058071 A | * | 5/2023 | ........... H04L 5/0035 |
| EP | 2733684 | | 5/2014 | |
| EP | 2850751 B1 | * | 4/2017 | ........... H04B 17/318 |
| EP | 3739356 A1 | * | 11/2020 | ............. G01P 15/18 |
| JP | 1997-507298 | | 7/1997 | |
| JP | 2004286567 | | 10/2004 | |
| JP | 2013072865 | | 4/2013 | |
| JP | 6324935 | | 5/2018 | |
| JP | 6776374 | | 10/2020 | |
| RU | 2619074 C2 | * | 5/2017 | ........... H04B 17/318 |
| WO | WO-2013171138 A2 | * | 11/2013 | ........... H04B 17/318 |
| WO | 2014021574 | | 2/2014 | |
| WO | 2014201574 | | 12/2014 | |
| WO | 2015/168700 | | 11/2015 | |
| WO | 2016005977 | | 1/2016 | |
| WO | 2016066822 | | 5/2016 | |
| WO | 2016110844 | | 7/2016 | |
| WO | 2017106976 | | 6/2017 | |
| WO | 2017132765 | | 8/2017 | |
| WO | WO-2017155587 A1 | * | 9/2017 | ......... H04B 7/18506 |
| WO | 2017177303 | | 10/2017 | |
| WO | 2017210770 | | 12/2017 | |
| WO | 2018071456 | | 4/2018 | |

(56) References Cited

FOREIGN PATENT DOCUMENTS

| WO | 2018094502 | | 5/2018 | | |
|---|---|---|---|---|---|
| WO | 2019041019 | | 3/2019 | | |
| WO | 2019075551 | | 4/2019 | | |
| WO | WO-2020096960 | A1 * | 5/2020 | ........... | G01S 13/003 |
| WO | 2020150806 | | 7/2020 | | |
| WO | 2020150807 | | 7/2020 | | |
| WO | 2020227804 | | 11/2020 | | |
| WO | 2020227805 | | 11/2020 | | |
| WO | 2020227806 | | 11/2020 | | |
| WO | 2021081635 | | 5/2021 | | |
| WO | 2021081637 | | 5/2021 | | |
| WO | WO-2022040817 | A1 * | 3/2022 | ........... | H04L 5/0035 |

OTHER PUBLICATIONS

USPTO, Notice of Allowance mailed Jan. 22, 2021 in U.S. Appl. No. 17/082,456, 35 pgs.
USPTO, Notice of Allowance mailed Jan. 21, 2021, in U.S. Appl. No. 17/082,411, 39 pgs.
WIPO, International Search Report and Written Opinion mailed Dec. 30, 2020, in PCT/CA2020/051442, 8 pgs.
WIPO, International Search Report and Written Opinion mailed Jan. 11, 2021, in PCT/CA2020/051440, 8 pgs.
Networking Layers—Apple Developer; https://developer.apple.com/library/archive/documentation/NetworkingInternet/Conceptual/NetworkingConcepts/NetworkingLayers/NetworkingLayers.html, Jul. 19, 2012, 4 pgs.
Banerjee, et al., "Through Wall People Localization Exploiting Radio Windows", arXiv:1307.7233v1, Jul. 27, 2013, 14 pgs.
Bejarano, et al., "IEEE 802.11ac: From Channelization to Multi-User MIMO", IEEE Communications Magazine, Oct. 1, 2013, 7 pgs.
Brauers, et al., "Augmenting OFDM Wireless Local Networks with Motion detection Capability", 2016 IEEE 6th International Conference on Consumer Electronics—Berlin (ICCE-Berlin); pp. 253-257, 2016, 5 pgs.
Cai, et al., "Human Movement Detection in Wi-Fi Mesh Networks", Technical Disclosure Commons, Dec. 17, 2017, 8 pgs.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Domenico, et al., "Exploring Training Options for RF Sensing Using CSI", IEEE Communications Magazine, 2018, vol. 56, Issue 5, pp. 116-123, 8 pgs.
Ganesan, et al., "Robust Channel Estimation for 802.11n (MIMO-OFDM) Systems", 2014 International Conference on Signal Processing and Communications (SPCOM), Bangalore; Jul. 22-25, 2014, 5 pgs.
Iqbal, et al., "Indoor Motion Classification Using Passive RF Sensing Incorporating Deep Learning", ISSN: 2577-2465, Electronic IEEE, Jun. 3, 2018, 5 pgs.
Keerativoranan, et al., "Mitigation of CSI Temporal Phase Rotation with B2B Calibration Method for Fine-Grained Motion Detection Analysis on Commodity Wi-Fi Devices", Sensors 2018, Nov. 6, 2018, 18 pgs.
Kosba, et al., "Robust WLAN Device-free Passive Motion Detection", IEEE Wireless Communications and Networking Conference, Apr. 2012, 6 pgs.
Krumm, et al., "Locadio: Inferring Motion and Location from Wi-Fi Signal Strengths", First Annual Int'l Conference on Mobile and Ubiquitous Systems: Networking and Services, Boston, MA, Aug. 22, 2004, 10 pgs.
Lai, "This mesh WiFi router can track motion to protect your family", https://www.engadget.com/2018-06-06-origin-wireless-wifi-mesh-motion-fall-sleep-detection.htm., Jun. 16, 2018, 6 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.
Youssef, et al., "Challenges: Device-free Passive Localization for Wireless Environments", Proceedings of the 13th Annual ACM Int'l Conference on Mobile Computing and Networking, Montreal, Canada, Sep. 9, 2007, 8 pgs.
WIPO, International Search Report and Written Opinion mailed Aug. 15, 2022, in PCT/CA2022/050749, 10 pgs.
USPTO, Notice of Allowance mailed Aug. 25, 2022, in U.S. Appl. No. 17/328,479, 47 pgs.
EPO, Extended European Search Report mailed Nov. 11, 2022, in EP 20881889.8, 8 pgs.
EPO, Extended European Search Report mailed Nov. 4, 2022, in EP 20881664.5, 8 pgs.
CIPO, Office Action issued in Application No. 3,152,900 on Jan. 18, 2024, 3 pages.
CIPO, Office Action issued in Application No. 3, 152,905 on Jan. 16, 2024, 4 pages.
CNIPA, Office Action issued in Application No. 202080074360.X on Mar. 8, 2024, 29 pages.
EPO, Communication pursuant to Article 94(3) issued in Application No. 20881889.8 on May 22, 2024, 6 pages.

* cited by examiner

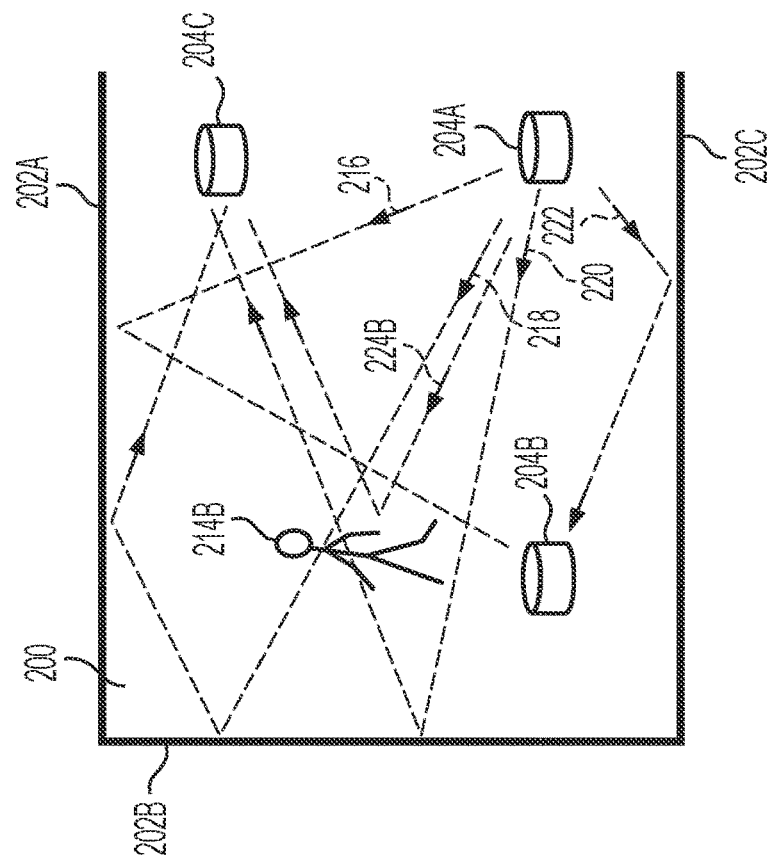
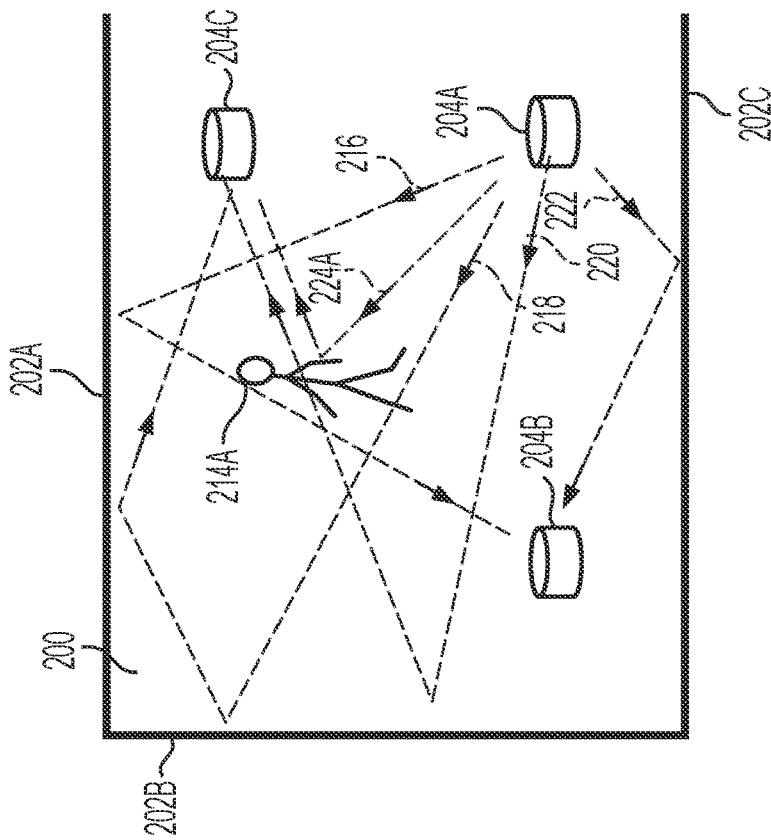
Fig. 2A
Fig. 2B

USING MIMO TRAINING FIELDS FOR MOTION DETECTION

CROSS-REFERENCE TO RELATED APPLICATIONS

This application is a continuation of U.S. patent application Ser. No. 17/082,456, filed Oct. 28, 2020, entitled "Using MIMO Training Fields for Motion Detection," which claims priority to U.S. Provisional App. No. 62/928,684, filed Oct. 31, 2019, entitled "Using MIMO Training Fields for Motion Detection," the contents of which are hereby incorporated by reference.

BACKGROUND

The following description relates to using multiple-input/multiple-output (MIMO) training fields for motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 2A-2B are diagrams showing example wireless signals communicated between wireless communication devices.

DETAILED DESCRIPTION

Figure 1:
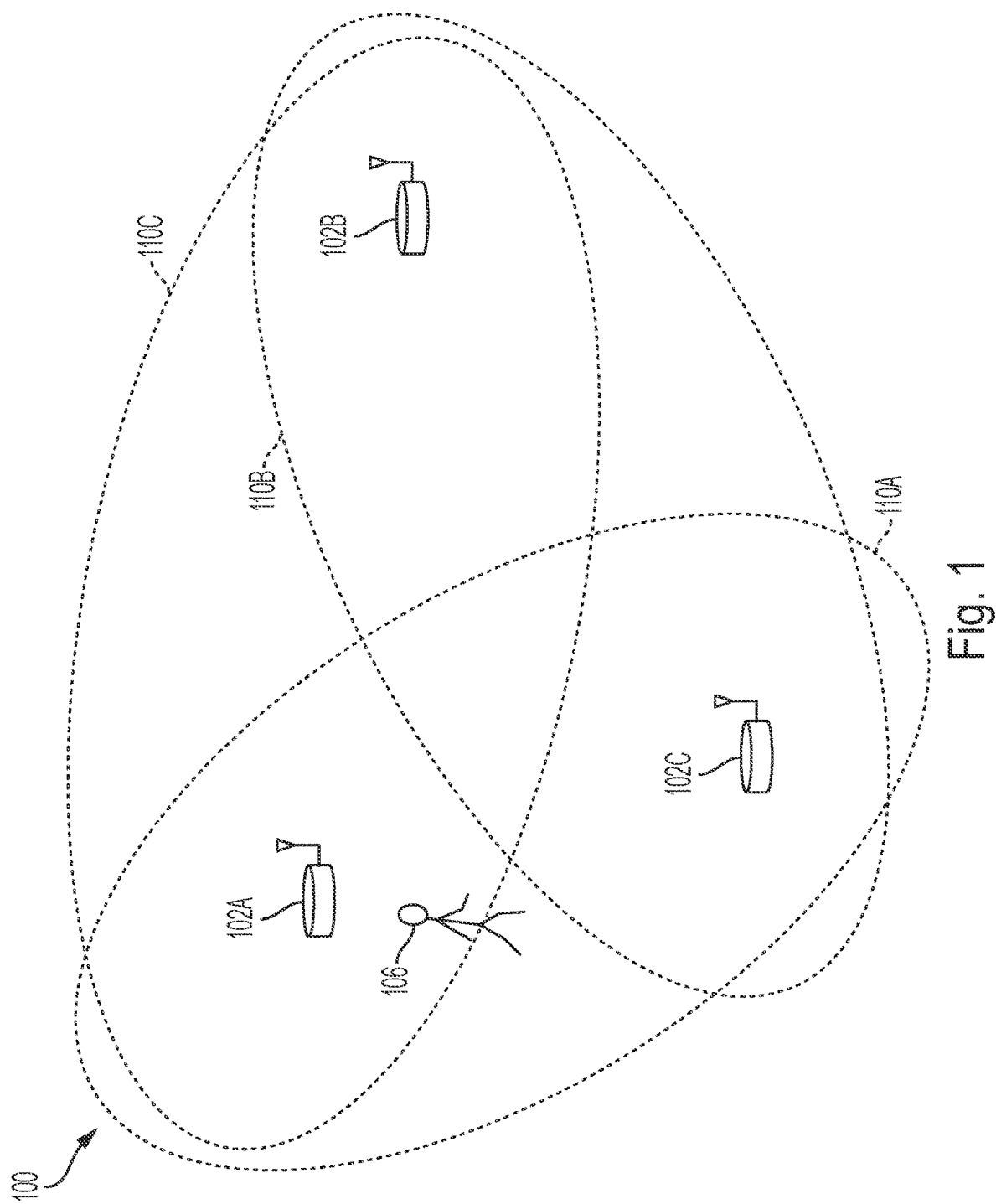
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. In some instances, wellness monitoring using the wireless sensing systems described herein may provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered included adjusting the thermostat when a person walk through the front door, turning other smart devices on or off based on preferences, automatically adjusting lighting, adjusting HVAC systems based on present occupants, etc.

In some aspects of what is described here, a multiple-input-multiple-output (MIMO) training field included in a wireless signal is used for motion detection. For instance, an HE-LTF field in a PHY frame of a wireless transmission according to the Wi-Fi 6 standard (IEEE 802.11ax) may be used for motion detection. The wireless signals may be transmitted through a space over a time period, for example, from one wireless communication device to another. A high-efficiency long training field (HE-LTF) or another type of MIMO training field may be identified in the PHY frame of each wireless signal. A Legacy PHY field may also be identified in the PHY frame of each wireless signal. Example Legacy PHY fields include L-LTF and L-STF. In some cases, channel information is generated based on the respective MIMO training fields and the respective Legacy PHY fields. The channel information obtained from the Legacy PHY fields can be used to make a macro-level determination of whether motion has occurred in the space during the time period. The channel information obtained from the MIMO training fields can be used to detect fine-grained motion attributes, for example, the location or direction of motion in the space during the time period.

In some instances, aspects of the systems and techniques described here provide technical improvements and advantages over existing approaches. For example, the MIMO training field may provide signals having higher frequency resolution, a greater number of subcarrier frequencies, and a higher frequency bandwidth (or a combination of these features) compared to signals provided by the Legacy PHY fields, which may provide more accurate and fine-grained motion detection capabilities. In some cases, motion detection can be performed with higher spatial and temporal resolution, precision and accuracy. The technical improvements and advantages achieved in examples where the wireless sensing system is used for motion detection may also be achieved in examples where the wireless sensing system is used for other wireless sensing applications.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on a hub device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data. In some implementations, motion data is a result that is indicative of a degree of motion in the space, the location of motion in the space, the direction of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability, U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 illustrates an example wireless communication system 100. The wireless communication system 100 may perform one or more operations of a motion detection system. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals may propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of a motion detection system.

FIGS. 2A and 2B are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C may be mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal may have a number of frequency components in a frequency bandwidth, and the transmitted signal may include one or more bands within the frequency bandwidth. The transmitted signal may be transmitted from the first wireless communication device 204A in an omni-directional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect motion of an object. Conversely, in some cases, if the transfer function of the space does not change, the output of the transfer function—the received signal—may not change.

Figure 2C:
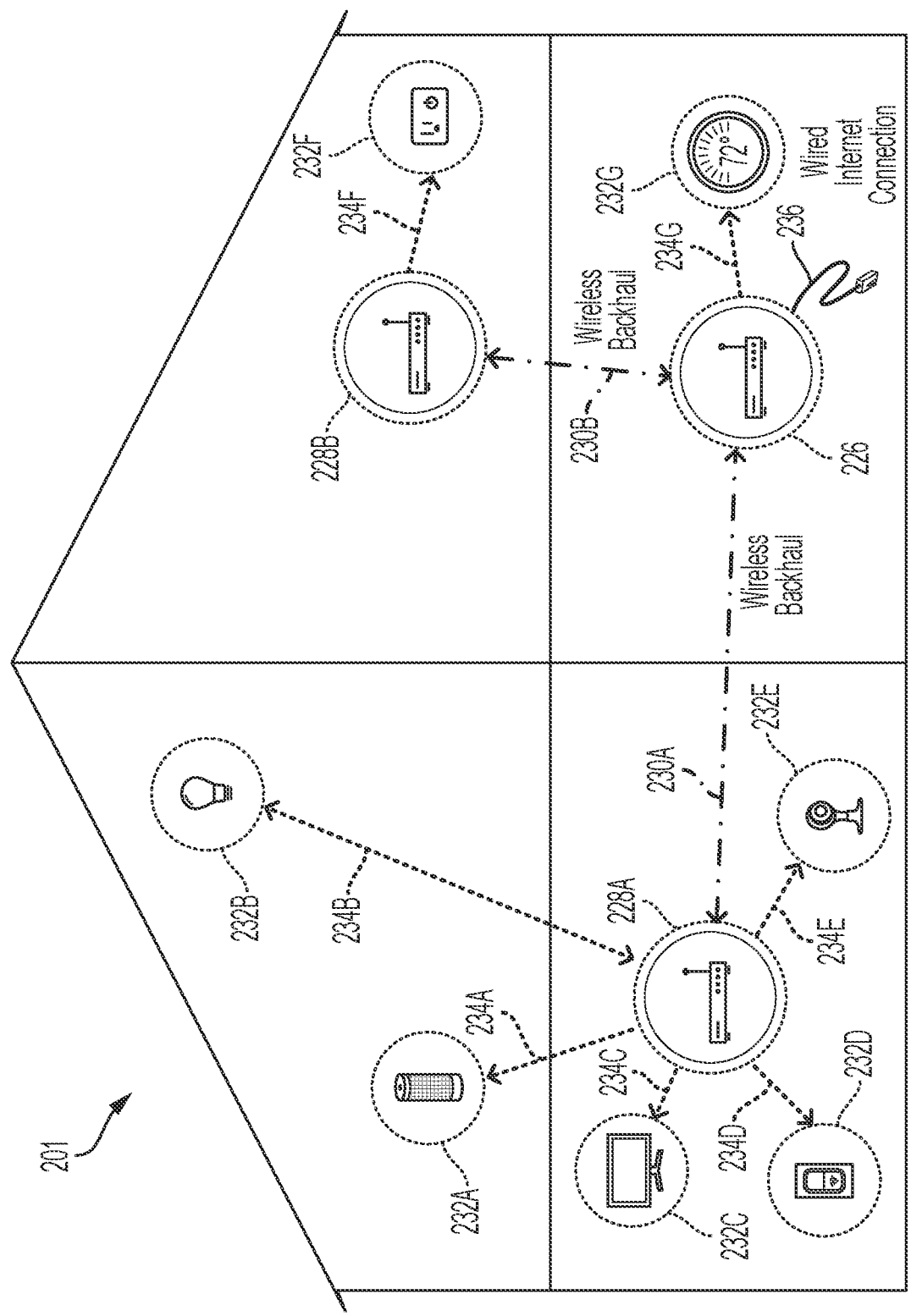
FIG. 2C is a diagram of an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP may use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as leaf nodes in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 may identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP may select its own channel independently to serve their respective client devices, and the wireless links 234 may be used for data communications as well as motion detection.

The motion detection system, which may include one or more motion detection or localization processes running on the one or more of the client devices 232 or on one or more of the APs 226, 228, may collect and process data (e.g., channel information) corresponding to local links that are participating in the operation of the wireless sensing system. The motion detection system may be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system are executed on one or more of the client devices 232. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 may have access to channel information provided by the client device's radio firmware (e.g., Wi-Fi radio firmware) so that channel information may be collected and processed.

In some implementations, the client devices 232 send a request to their corresponding AP 226, 228 to transmit wireless signals that can be used by the client device as motion probes to detect motion of objects in the space 201. The request sent to the corresponding AP 226, 228 may be a null data packet frame, a beamforming request, a ping, standard data traffic, or a combination thereof. In some implementations, the client devices 232 are stationary while performing motion detection in the space 201. In other examples, one or more of the client devices 232 may be mobile and may move within the space 201 while performing motion detection.

Mathematically, a signal f(t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k$(t) from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device (e.g., the wireless communication devices 204B, 204C in FIGS. 2A and 2B or the client devices 232 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value $Y_n$) can be indicative of motion of an object within the communication channel. Conversely, a stable channel response may indicate lack of motion. Thus, in some implementations, the complex values $Y_n$ for each of multiple devices in a wireless network can be processed to detect whether motion has occurred in a space traversed by the transmitted signals f(t). The channel response can be expressed in either the time-domain or frequency-domain, and the Fourier-Transform or Inverse-Fourier-Transform can be used to switch between the time-domain expression of the channel response and the frequency-domain expression of the channel response.

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

In some implementations, the output of the motion detection system may be provided as a notification for graphical display on a user interface on a user device. In some implementations, the user device is the device used to detect motion, a user device of a caregiver or emergency contact designated to an individual in the space 200, 201, or any other user device that is communicatively coupled to the motion detection system to receive notifications from the motion detection system.

In some instances, the graphical display includes a plot of motion data indicating a degree of motion detected by the motion detection system for each time point in a series of time points. The graphical display can display the relative degree of motion detected by each node of the motion detection system. The graphical display can help the user determine an appropriate action to take in response to the motion detection event, correlate the motion detection event with the user's observation or knowledge, determine whether the motion detection event was true or false, etc.

In some implementations, the output of the motion detection system may be provided in real-time (e.g., to an end user). Additionally or alternatively, the output of the motion detection system may be stored (e.g., locally on the wireless communication devices 204, client devices 232, the APs 226, 228, or on a cloud-based storage service) and analyzed to reveal statistical information over a time frame (e.g., hours, days, or months). An example where the output of the motion detection system may be stored and analyzed to reveal statistical information over a time frame is in health monitoring, vital sign monitoring, sleep monitoring, etc. In some implementations, an alert (e.g., a notification, an audio alert, or a video alert) may be provided based on the output of the motion detection system. For example, a motion detection event may be communicated to another device or system (e.g., a security system or a control center), a designated caregiver, or a designated emergency contact based on the output of the motion detection system.

In some implementations, a wireless motion detection system can detect motion by analyzing components of wireless signals that are specified by a wireless communication standard. For example, a motion detection system may analyze standard headers of wireless signals exchanged in a wireless communication network. One such example is the IEEE 802.11ax standard, which is also known as "Wi-Fi 6." A draft of the IEEE 802.11ax standard is published in a document entitled "P802.11ax/D4.0, IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN," March 2019, which is accessible at https://ieeexplore.ieee.org/document/8672643 and hereby incorporated by reference in its entirety. Standard headers specified by other types of wireless communication standards may be used for motion detection in some cases.

In some implementations, a motion detection algorithm used by a wireless motion detection system utilizes a channel response (an output of a channel estimation process) computed by a wireless receiver (e.g., a Wi-Fi receiver). For example, the channel responses computed by a channel estimation process according to a Wi-Fi 6 standard may be received as inputs to the motion detection algorithm. The channel estimation in the Wi-Fi 6 standard occurs at the PHY layer, using the PHY Frame (the PHY Frame is also called a PPDU) of the received wireless signal.

In some examples, a motion detection algorithm employed by a wireless motion detection system uses channel responses computed from orthogonal frequency-division multiplexing (OFDM)-based PHY frames (including those produced by the Wi-Fi 6 standard). The OFDM-based PHY frames can, in some instances, be frequency-domain signals having multiple fields, each having a corresponding frequency-domain signal. With this class of OFDM-based PHY frames, there are typically two types of PPDU fields that allow the Wi-Fi receiver to estimate the channel. The first is the Legacy-Training-Field, and the second are the MIMO-Training-Fields. Either or both fields may be used for motion detection. An example of a MIMO-Training-Field that may be used is the so-called "High-Efficiency Long Training Field" known as HE-PHY (e.g., in the Wi-Fi 6 standard, according to the IEEE 802.11ax standard).

Figure 3:
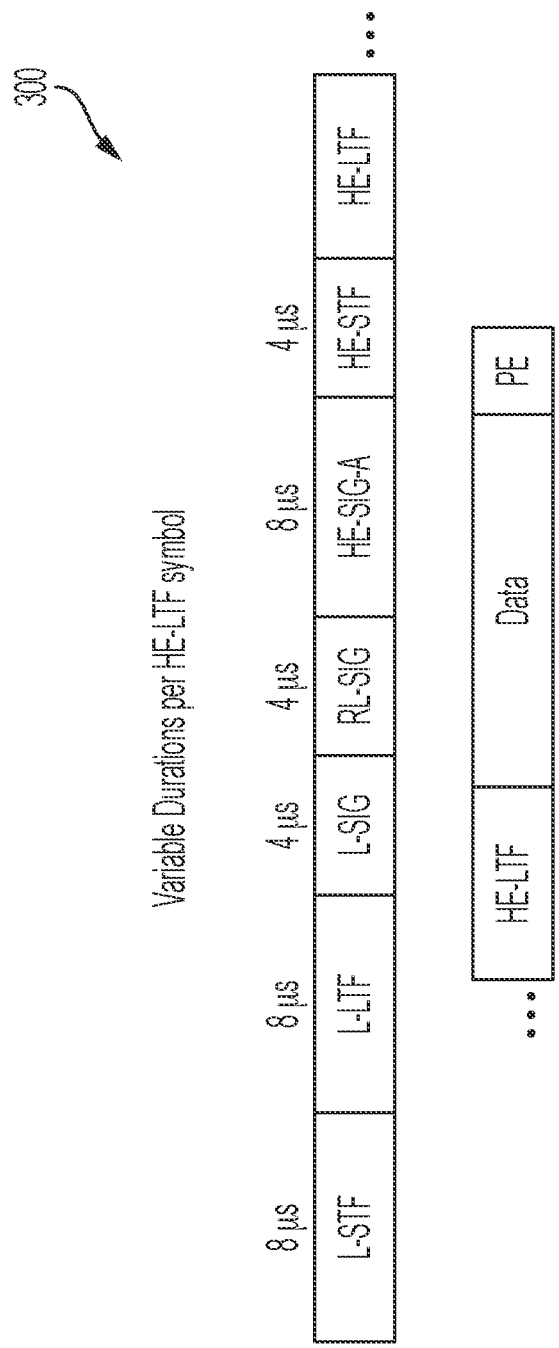
FIG. 3 is a diagram showing an example PHY frame.

FIG. 3 shows an example PHY Frame 300 that includes an HE-LTF. The example PHY Frame 300 shown in FIG. 3 is from the IEEE 802.11ax standard. These and other types of PHY frames that include an HE-LTF may be used for motion detection in some cases. As shown in FIG. 3, the example PHY Frame 300 includes a number of fields that are defined in the 802.11 standard: L-STF (Legacy Short Training Field), L-LTF (Legacy Long Training Field), L-SIG (Legacy Signal), RL-SIG (Repeated Legacy Signal), HE-SIG-A (High-Efficiency Signal), HE-STF (High-Efficiency Short Training Field), multiple HE-LTFs, Data, PE (Packet Extension). In some instances, the L-LTF field can be used to estimate channel responses that can be provided as input to a motion detection algorithm. The HE-LTF fields, which are provided as MIMO Training Fields, can also be used to estimate channel responses that can be provided as input to a motion detection algorithm.

In the example shown in FIG. 3, the HE-LTFs can have variable duration and bandwidths, and in some examples the PHY Frame 300 breaks a 20 MHz channel into 256 frequency points (instead of 64 used by previous PHY Frame versions). As such, the example HE-LTFs in the PHY Frame 300 may provide four times better frequency resolution (e.g., compared to earlier PHY frame versions), as each point represents a frequency bandwidth of 78.125 kHz instead of 312.5 kHz. Stated differently, consecutive frequency points in the HE-LTFs in the PHY Frame 300 are closer together compared to consecutive frequency points in the Legacy PHY fields in the PHY Frame 300. Also, the HE-LTF provides more continuous sub carriers than other fields, and hence a wider continuous frequency bandwidth can be used for motion detection. For instance, Table I (below) shows the continuous frequency bandwidths and frequency resolution for the HE-LTF field (labeled "HE" in the table) compared to Legacy PHY fields (L-STF and L-LTF) and other MIMO Training Fields (e.g., High-Throughput (HT) Long Training Field and Very-High-Throughput (VHT) Long Training Field).

TABLE I

| Bandwidth | Continuous HE Subcarriers | Continuous HE Bandwidth | Continuous Legacy Bandwidth | Continuous HT/VHT Bandwidth |
| --- | --- | --- | --- | --- |
| 20 MHz | 121 | 9.453 MHz (121*78.125 kHz) | 8.125 MHz (26 Subcarriers) | 8.750 MHz (28 Subcarriers) |
| 40 MHz | 242 | 18.91 MHz (242*78.125 kHz) | 8.125 MHz (26 Subcarriers) | 17.8125 MHz (56 Subcarriers) |
| 80 MHz | 498 | 38.91 MHz (498*78.125 kHz) | 8.125 MHz (26 Subcarriers) | 17.8125 MHz (56 Subcarriers) |
| 160 MHz | 498 | 38.91 MHz (498*78.125 kHz) | 8.125 MHz (26 Subcarriers) | 17.8125 MHz (56 Subcarriers) |

In some IEEE 802.11 standards, the PHY layer is broken into 2 sub-layers: the PLCP Sublayer (Physical Layer Convergence Procedure), and the PMD Sublayer (PHY Medium Dependant). The PLCP Sublayer (Physical Layer Convergence Procedure) takes data from the MAC layer and translates it into a PHY frame format. The format of the PHY frame is also referred to as a PPDU (PLCP Protocol Data Unit). A PPDU may include fields that are used for channel estimation. The PMD Sublayer (PHY Medium Dependant) provides a modulation scheme for the PHY layer. There are many different IEEE 802.11 based PHY frame formats defined. In some examples, a wireless motion detection system uses information derived from OFDM based PHY frames, such as, for example, those described in the following standard documents: IEEE 802.11a-1999: Legacy OFDM PHY; IEEE 802.11n-2009: HT PHY (High-Throughput); IEEE 802.11ac-2013: VHT PHY (Very-High-Throughput); IEEE 802.11ax (Draft 4.0, March 2019): HE PHY (High-Efficiency).

Other types of PHY layer data may be used, and each PHY layer specification may provide its own PPDU format. For instance, the PPDU format for a PHY layer specification may be found in some IEEE 802.11 standards under the section heading "<XXX> PHY Specification"=>"<XXX> PHY"=>"<XXX> PPDU Format". The example PHY frame 300 shown in FIG. 3 is an HE PHY frame provided by an ODFM PHY layer of an example 802.11 standard.

In some IEEE 802.11 standards (e.g., IEEE 802.11a-1999), the OFDM PHY divides a 20 MHz channel into 64 frequency bins. Modulation and Demodulation is done using 64-point complex inverse Fast Fourier Transform (IFFT) and Fast Fourier Transform (FFT). In an example modulation process: data bits grouped (e.g., depending on QAM constellation), each group of bits is assigned to one of the subcarriers (or frequency bins); depending on QAM constellation, group of bits mapped to a complex number for each subcarrier; and a 64-point IFFT is performed to generate complex-time-domain I and Q waveforms for transmission. In an example demodulation process: complex I and Q time domain signals are received; a 64-point FFT is performed to compute complex number for each subcarrier; depending on QAM constellation, each subcarrier complex number is mapped to bits; and bits from each subcarrier are re-assembled into data. In a typical modulation or demodulation process, not all 64 subcarriers are used; for example, only 52 of the subcarriers may be considered valid for data and pilot, and the rest of the subcarriers may be considered NULLED. The PHY layer specifications in more recently-developed IEEE 802.11 standards utilize larger channel bandwidths (e.g., 40 MHz, 80 MHz, and 160 MHz).

Figure 4:
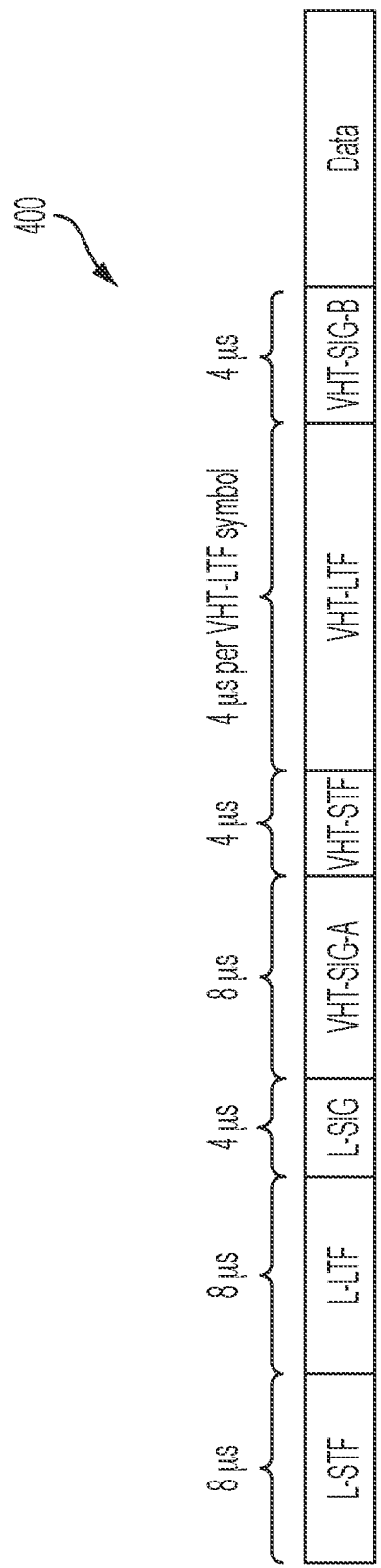
FIG. 4 is a diagram showing an example PHY frame.

FIG. 4 shows an example PHY Frame 400 that includes a Very High Throughput Long Training Field (also referred to as "VHT-LTF"). The example PHY Frame 400 shown in FIG. 4 is from the IEEE 802.11ac standard. A draft of the IEEE 802.11ac standard is published in a document entitled "802.11ac-2013-IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," December 2018, which is accessible at https://ieeexplore.ieee.org/document/7797535 and hereby incorporated by reference in its entirety. These and other types of PHY frames that include a VHT-LTF may be used for motion detection in some cases.

Figure 5:
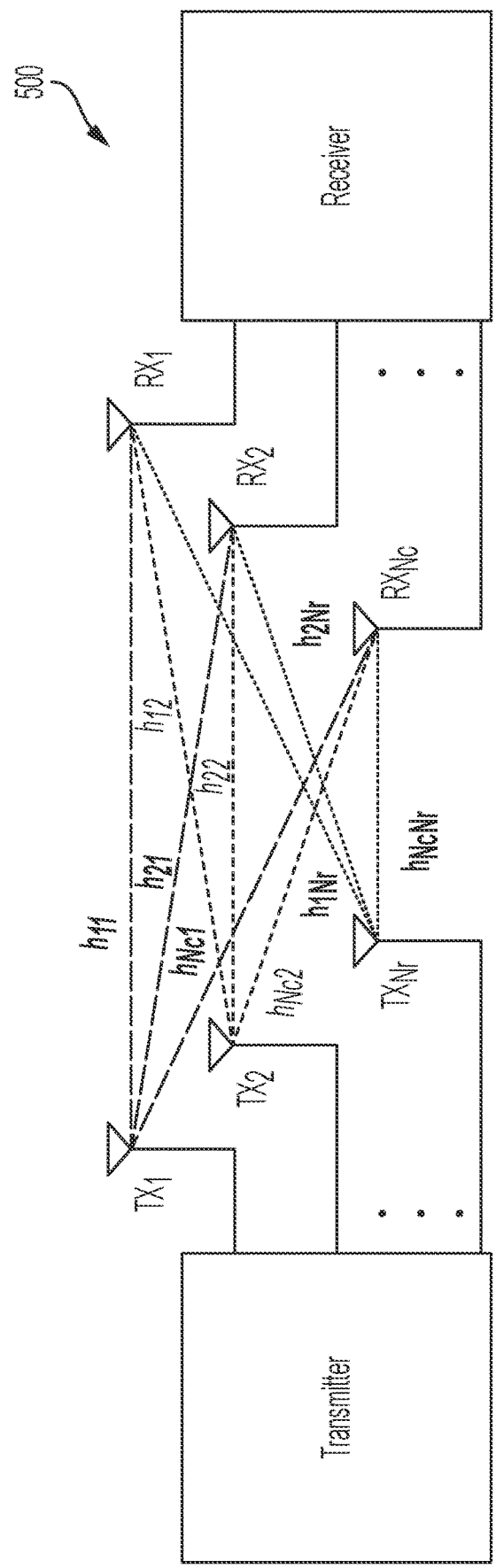
FIG. 5 is a diagram showing an example multiple-input-multiple-output (MIMO) radio configuration.

As shown in FIG. 4, the example PHY Frame 400 includes a number of components that are defined in the 802.11 standard: L-STF, L-LTF, L-SIG, VHT-SIG-A (Very-High-Throughput Signal A), VHT-STF (Very-High-Throughput Short Training Field), VHT-LTF (Very-High-Throughput Long Training Field), VHT-SIG-B (Very-High-Throughput Signal B), Data. The PPDU for Legacy, HT, VHT, and HE PHYs begin with a Legacy Preamble which includes the L-STF and the L-LTF, as shown in the example PHY frame 400 in FIG. 4. The L-LTF can be used for channel estimation in some cases. The VHT-LTF, which has a wider bandwidth compared to the L-LTF and contains similar information, can be used for MIMO channel estimation. The HT-LTF and VHT-LTF are very similar, except that the VHT-LTF allows higher order MIMO and allows 80 MHz and 160 MHz channels. These fields are beneficial to use for motion detection because they can provide wider continuous frequency bandwidth and MIMO channel information. With MIMO channel estimation, there are generally Nr×Nc channel responses computed. This provides more information with benefit to motion detection. FIG. 5 shows an example MIMO device configuration 500 including a transmitter having Nr antennas and a receiver having Nc antennas. In the example of FIG. 5, Nr×Nc channel responses may be computed based on the HE-LTF or the VHT-LTF or another MIMO training component of a PHY frame.

In some implementations, a wireless communication device computes a channel response, for example, by performing a channel estimation process based on a PHY frame. For instance, a wireless communication device may perform channel estimation based on the example PHY frame 300 shown in FIG. 3, the example PHY frame 400 shown in FIG. 4, or another type of PHY frame from a wireless signal.

In some instances, the channel information used for motion detection may include a channel response generated by channel estimation based on the L-LTF in the PHY frame. The L-LTF in the 802-11ax standard can be equivalent to the LTF in the IEEE 802.11a-1999 standard. The L-LTF may be provided in the frequency domain as an input to a 64-point IFFT. Typically, only 52 of the 64 points are considered valid points for channel estimation; and the remaining points (points [−32, −26) and (26, 31]) are zero. As described in the IEEE 802.11a-1999 standard, the L-LTF may be a long OFDM training symbol including 53 subcarriers (including a zero value at DC), which are modulated by the elements of a sequence L given by the following:

$$L_{-26,26} = \{1, 1, -1-1, 1, 1, -1, 1, -1, 1, 1, 1, 1, 1, 1,$$
$$-1, -1, 1, 1, -1, 1, -1, 1, 1, 1, 1, 0, 1, -1, -1, 1, 1, -1, 1,$$
$$-1, 1, -1, -1, -1, -1, -1, 1, 1, -1, -1, 1, -1, 1, -1, 1, 1, 1\}$$

The example "L" vector shown above represents the complex frequency-domain representation of the field at baseband (centered around DC) and is described in page 13 of a draft of the IEEE 802.11a-1999 standard. The draft of the IEEE 802.11a-1999 standard is published in a document entitled "802.11a-1999-IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band" and accessible at https://ieeexplore.ieee.org/document/815305. The example "L" vector is considered "Legacy", as it was part of the original OFDM PHY specification, and is considered part of the legacy preamble. Hence in later specification versions, it is referred to as the L-LTF (for Legacy-Long Training Field).

In some instances, the channel information used for motion detection may include a channel response generated by channel estimation based on one or more of the MIMO training fields in the PHY frame (e.g., the HE-LTF, HT-LTF, or VHT-LTF fields). The HE-LTF may be provided in the frequency domain as an input to a 256-point IFFT. With a typical HE-LTF, there are 241 valid points (e.g., instead of 52 as in the legacy case). Each point in the HE-LTF represents a frequency range of 78.125 kHz, whereas each Legacy point represents a larger frequency range of 312.5 kHz. Therefore, the HE-LTF may provide higher frequency resolution, more frequency domain data points, and a larger frequency bandwidth, which can provide more accurate and higher-resolution (e.g., higher temporal and spatial resolution) motion detection. An example HE-LTF is described on page 561 of the draft of the IEEE 802.11ax standard as follows:

In a 20 MHz transmission, the 4x HE-LTF sequence transmitted on subcarriers [−122, 122] is given by Equation (27-42).

$$HELTF_{-122,122} = \qquad (27-42)$$
$$\{-1, -1, +1, -1, +1, -1, +1, +1, +1, -1, +1, +1, -1,$$
$$-1, +1, -1, -1, -1, -1, -1, +1, +1, -1, -1, -1, +1, +1,$$
$$-1, +1, -1, +1, +1, +1, +1, -1, +1, -1, -1, +1, +1, -1,$$
$$+1, +1, +1, +1, -1, -1, +1, -1, -1, -1, +1, +1, +1, +1,$$
$$-1, +1, +1, -1, -1, -1, -1, +1, -1, -1, +1, +1, -1, +1,$$
$$-1, -1, -1, -1, +1, -1, +1, -1, -1, -1, -1, -1, +1,$$
$$+1, -1, -1, -1, -1, -1, +1, -1, -1, +1, +1, +1, -1, +1,$$

-continued

+1, +1, −1, +1, −1, +1, −1, −1, −1, −1, −1, −1, +1, +1,

+1, −1, −1, −1, +1, −1, +1, +1, +1, 0, 0, 0, −1. + 1, −1,

+1, −1, +1, +1, −1, +1, +1, +1, −1, −1, +1, −1, −1, +1,

−1, +1, −1, +1, +1, +1, +1, −1, +1, +1, +1, −1, −1,

+1, −1, −1, −1, −1, −1, +1, +1, −1, −1, −1, −1, −1 + 1,

−1, +1. − 1, +1, −1, −1, −1, −1, +1, −1, +1, +1, −1,

−1. + 1, −1, −1, −1, −1, +1, +1, −1, +1, +1, +1, +1, +1,

+1, +1, −1, +1, +1, −1, −1, −1, +1, −1, +1, −1, −1, +1,

−, 1 − 1, +1, −1 − 1, −1, −1, −1, +1, −1, +1, −1, −1,

+1, +1, +1, −1, −1, +1, +1, +1, +1, +1, −1, +1, +1,

−1, −1, −1, +1, −1, −1, −1, +1, −1, +1, −1, +1, +1}

Figure 6:
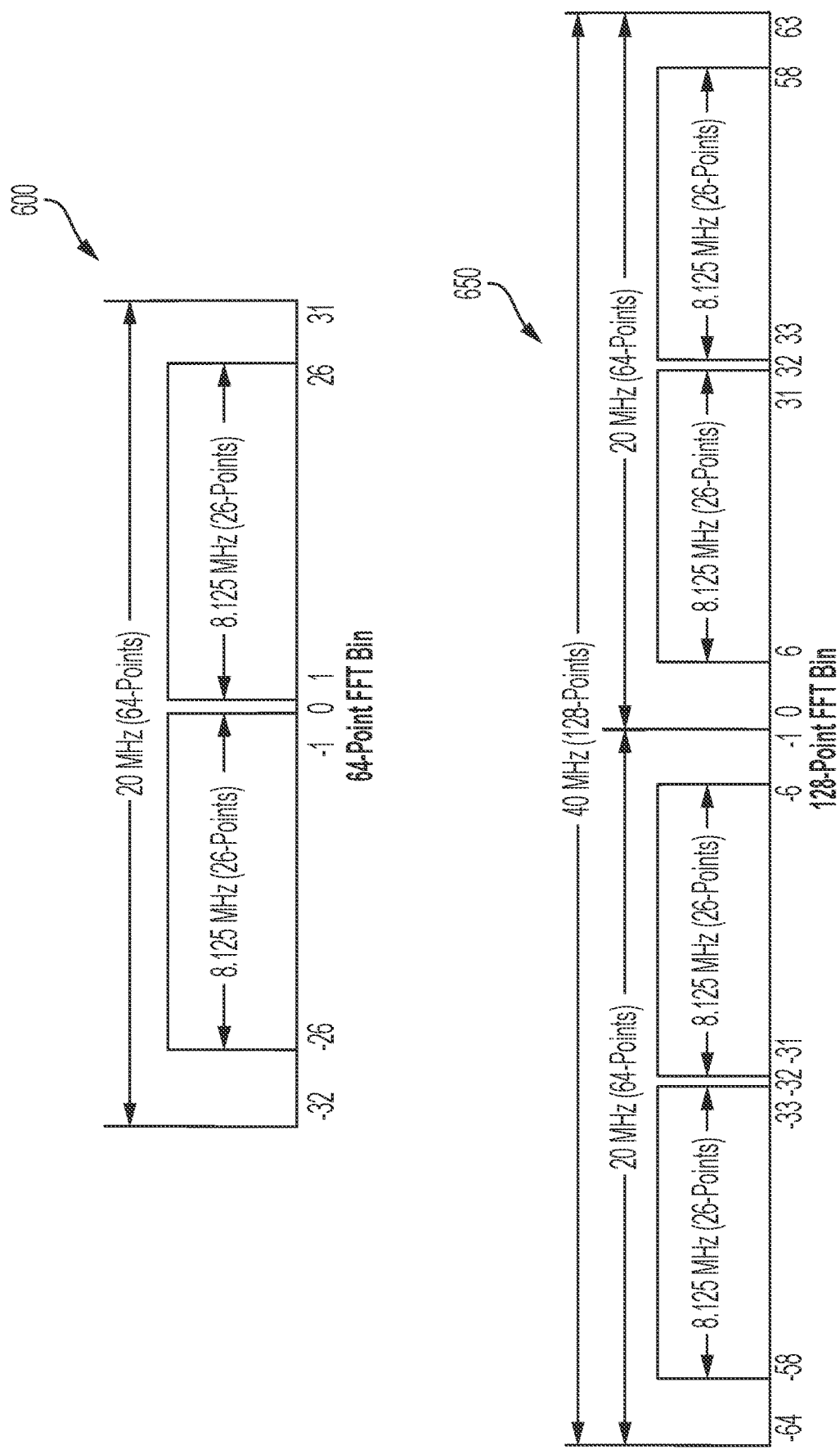
FIG. 6 is a diagram showing example frequency spectra of wireless signals.

In some instances, a channel response can be estimated on a receiver device by performing an FFT of the received time-domain sequence (e.g., the example L-LTF and HE-LTF sequences shown above), and dividing by the expected result [CH(N)=RX(N)/L(N)]. The 64-Point FFT Bin 600 in the top portion of FIG. 6 shows the resulting spectrum that can be measured (20 MHz and 40 MHz channels) from the L-LTF in an example PHY frame. The 128-Point FFT Bin 650 in the bottom portion of FIG. 6 shows the resulting spectrum that can be measured for the same 20 MHz channels from the HE-LTF in an example PHY frame. As shown in FIG. 6, the HE-LTF may provide higher frequency resolution (more points in the same frequency bandwidth), a higher number of frequency domain data points (more bins), and a larger frequency bandwidth.

Figure 7:
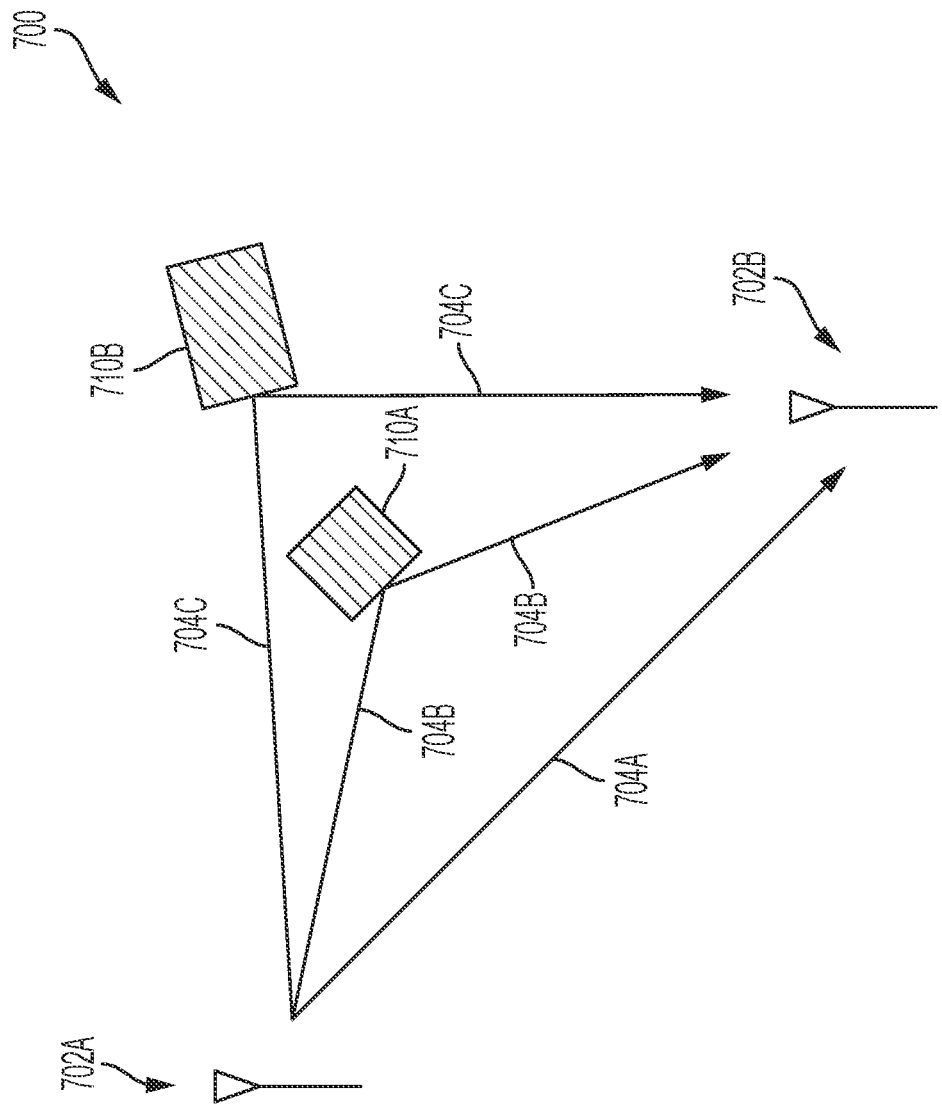
FIG. 7 is a diagram showing example signal paths in a wireless communication system.

FIG. 7 is a diagram showing example signal paths in a wireless communication system 700. The example wireless communication system 700 shown in FIG. 7 includes wireless communication devices 702A, 702B. The wireless communication devices 702A, 702B may be, for example, the wireless communication devices 102A, 102B shown in FIG. 1, the wireless communication devices 204A, 204B, 204C shown in FIGS. 2A and 2B, the devices 226, 228, 232 shown in FIG. 2C, or they may be other types of wireless communication devices. The wireless communication system 700 operates in an environment that includes two scatterers 710A, 710B. The wireless communication system 700 and its environment may include additional or different features.

In the example shown in FIG. 7, the wireless communication device 702A transmits a radio frequency (RF) wireless signal, and the wireless communication device 702B receives the wireless signal. In the environment between the wireless communication devices 702A, 702B, the wireless signal interacts with the scatterers 710A, 710B. The scatterers 710A, 710B can be any type of physical object or medium that scatters radio frequency signals, for example, part of a structure, furniture, a living object, etc. Each wireless signal can include, for example, a PHY frame that includes Legacy PHY fields and one or more MIMO training fields (e.g., HE-LTF, VHT-LTF, HT-LTF) that can be used for motion detection.

In the example shown in FIG. 7, the wireless signal traverses a direct signal path 704A and two indirect signal paths 704B, 704C. Along signal path 704B from the wireless communication device 702A, the wireless signal reflects off the scatterer 710A before reaching the wireless communication device 702B. Along signal path 704C from the wireless communication device 702A, the wireless signal reflects off the scatterer 710B before reaching the wireless communication device 702B.

The propagation environment represented by the signal paths shown in FIG. 7 can be described as a time-domain filter. For instance, the characteristic response, or impulse response, of the propagation environment shown in FIG. 7 can be represented by the time-domain filter:

$$h(t) = \sum_{k=1}^{3} \alpha_k \delta(t - \tau_k) \quad (6)$$

Here, the integer k indexes the three signal paths, and the coefficients $\alpha_k$ are complex phasors that represent the magnitude and phase of the scattering along each signal path. The values of the coefficients $\alpha_k$ are determined by physical characteristics of the environment, for example, free space propagation and the type of scattering objects present. In some examples, increasing attenuation along a signal path (e.g., by an absorbing medium like a human body or otherwise) may generally decrease the magnitude of the corresponding coefficient $\alpha_k$. Similarly, a human body or another medium acting as a scatterer can change the magnitude and phase of the coefficients $\alpha_k$.

Figure 8:
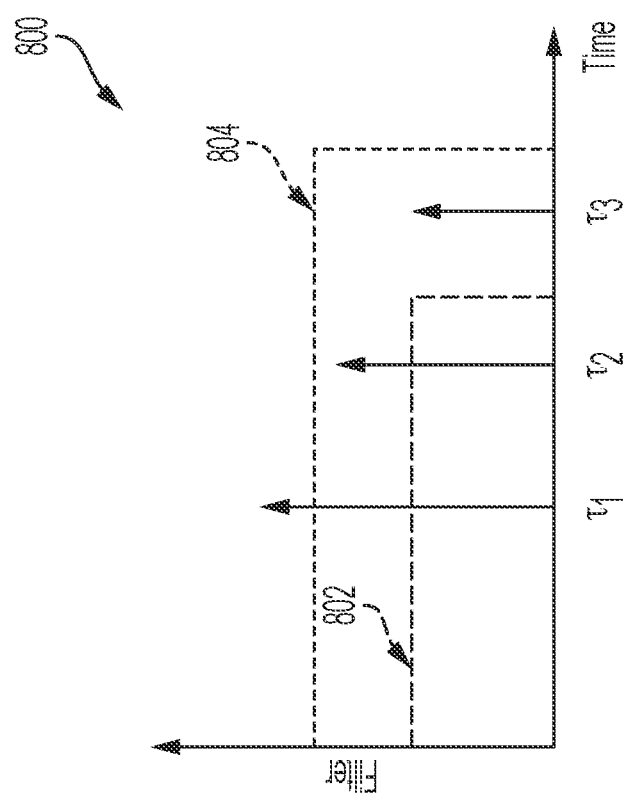
FIG. 8 is a plot showing an example filter representation of a propagation environment.

FIG. 8 is a plot 800 showing an example filter representation of a propagation environment. In particular, the plot 800 in FIG. 8 shows a time domain representation of the filter h(t) in Equation (6) above. The horizontal axis of the plot 800 represents time, and the vertical axis represents the value of the filter h(t). As shown in FIG. 8, the filter can be described by three pulses distributed across the time axis (at times $\tau_1$, $\tau_2$ and $\tau_3$). In this example, the pulse at time $\tau_1$ represents the impulse response corresponding to signal path 704A in FIG. 7, the pulse at time $\tau_2$ represents the impulse response corresponding to signal path 704B in FIG. 7, and the pulse at time $\tau_3$ represents the impulse response corresponding to signal path 704C in FIG. 7. The size of each pulse in FIG. 8 represents the magnitude of the respective coefficient $\alpha_k$ for each signal path.

A time domain representation of a filter may have additional or different pulses or other features. The number of pulses, as well as their respective locations on the time axis and their respective magnitudes, may vary according to the scattering profile of the environment. For example, if an object were to show up towards the end of the coverage area (e.g., at scatterer 710B), this may cause the third pulse (at time $\tau_3$) to move towards the left or the right. Typically, the first pulse (at time $\tau_1$) represents the earliest pulse or direct line of sight in most systems; accordingly, if an object were to come in the line of sight between transmitter and receiver, this pulse would be affected. In some instances, distance and direction of motion (relative to the transmitter and receiver) in the propagation environment can be inferred by looking at the behavior of these pulses over time. As an example, in some instances, an object moving towards the line of sight may affect the third, second and first pulses in that order, while an object moving away from the line of sight may affect the pulses in the opposite order.

Taking the Fourier transform of the filter h(t) from Equation (6) provides a frequency representation of the filter:

$$H(f) = \sum_{k=1}^{3} \alpha_k e^{-j2\pi f \tau_k} \quad (7)$$

In the frequency representation shown in Equation (7), each impulse from Equation (6) has been converted to a complex exponential (a sine and cosine wave). Each component of the exponential in the frequency domain has a specific frequency of rotation which is given by an associated pulse time $\tau_k$ with a certain phase.

In some implementations, when a wireless communication device (e.g., a WiFi transceiver) receives a wireless signal, the wireless communication device obtains a frequency-domain representation from the PHY frames of the wireless signals, which may be expressed in the form of Equation (7) or otherwise. In some instances, a motion detection system can convert the frequency-domain representation to a time-domain representation, which may be expressed in the form of Equation (6) or otherwise. The motion detection system may then make inferences regarding motion in the propagation environment (e.g., near/far, line of sight/non line of sight motion) based on the time-domain representation.

In some implementations, the motion detection system uses channel responses estimated based on a Legacy PHY field (e.g., L-STF, L-LTF) and channel responses estimated based on a MIMO training field (e.g., HE-LTF, VHT-LTF, HT-LTF) to make inferences regarding motion in the propagation environment. In some instances, the differences in the continuous frequency bandwidths and frequency resolutions of the MIMO training field and the Legacy PHY field can be used to detect motion in a space with varying granularity. For example, the time-domain channel responses estimated based on the Legacy PHY field (e.g., referred to as Legacy PHY-based channel responses) may be used to make a macro-level determination of whether motion has occurred in the propagation environment, while the time-domain channel responses estimated based on the MIMO training field (e.g., referred to as MIMO field-based channel responses) may be used to make a finer-grained determination of motion. As an example, MIMO field-based channel responses can be used to make inferences regarding the location of the motion in the propagation environment, the direction of the motion in the propagation environment, or both. The MIMO field-based channel responses may be referred to as HE-LTF-based channel responses, HT-LTF-based channel responses, or VHT-LTF-based channel responses depending on which MIMO training field is used to estimate the channel response.

As an illustration, FIG. 8 shows an example time window 802 of a Legacy PHY-based channel response and an example time window 804 of a MIMO field-based channel response. The continuous frequency bandwidth of each the MIMO training fields (e.g., HE-LTF, VHT-LTF, HT-LTF) is greater than the continuous frequency bandwidth of each of the Legacy PHY fields (e.g., as seen above in Table I). Furthermore, the frequency resolution of each the MIMO training fields is finer (e.g. higher) than the frequency resolution of each of the Legacy PHY fields (e.g., as seen above in Table I). Therefore, based at least on the duality between the time and frequency domains, the MIMO field-based channel responses have finer temporal resolution over a larger time window compared to the Legacy PHY-based channel responses. Stated differently, time points in the MIMO field-based channel responses are closer together compared to time points in the Legacy PHY-based channel responses, and the MIMO field-based channel responses extend over a longer time period compared to the Legacy PHY-based channel responses.

Since the duration of the time window 804 is greater than the duration of the time window 802, the MIMO field-based channel response is able to detect the third pulse (at time $\tau_3$) without aliasing artifacts, thus accurately revealing the existence of indirect signal path 704C and scatterer 710B in the propagation environment. Furthermore, since the continuous frequency bandwidth of the MIMO training fields is greater than the continuous frequency bandwidth of the Legacy PHY fields, the MIMO field-based channel response has a finer (e.g., higher) temporal resolution than the Legacy PHY-based channel response. Since the MIMO field-based channel response has a finer (e.g., higher) temporal resolution, shifts of any of the channel response's pulses towards the left or the right (e.g. caused by motion along the direct path 704A or indirect paths 704B, 704C) can be detected without aliasing artifacts. For example, motion at the scatterer 710B (e.g., caused by motion of the scatterer 710B or motion of an object near the scatterer 710B) may cause the third pulse (at time $\tau_3$) to move towards the left or the right. The finer (e.g., higher) temporal resolution of the MIMO field-based channel response can detect the shifts in the third pulse (at time $\tau_3$) without aliasing artifacts, thus allowing an inference that motion has occurred at the location of the scatterer 710B.

Figure 9A:
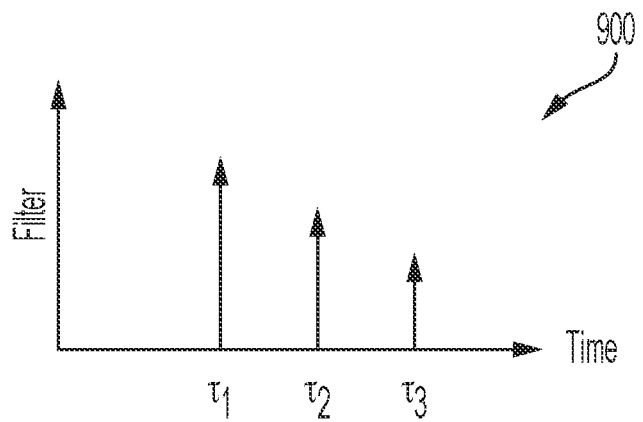
FIGS. 9A to 9C are plots showing example changes in a filter representation over time.
Figure 9B:
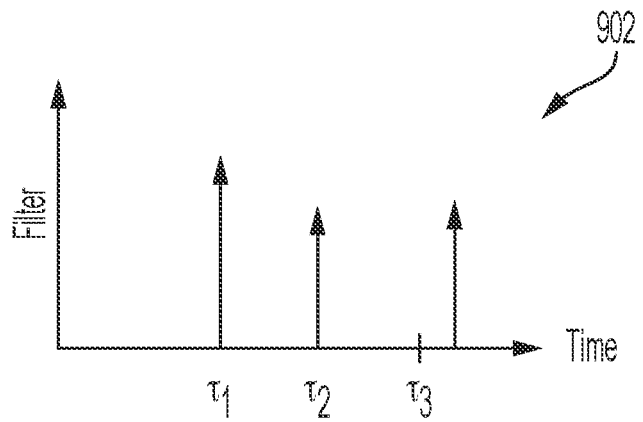
Figure 9C:
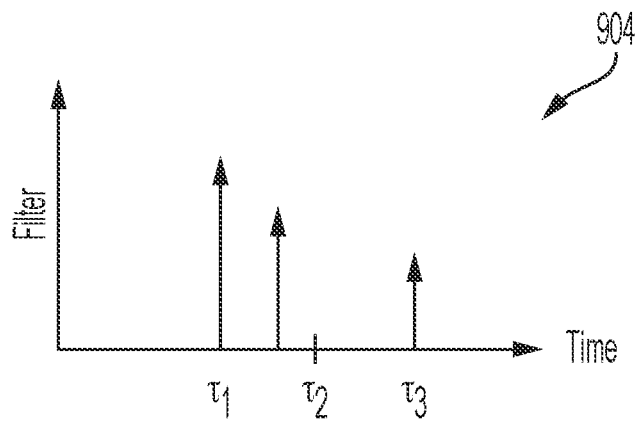

Furthermore, the direction of motion (relative to the transmitter and receiver) in the propagation environment can, in some instances, be inferred by determining a change in the channel response's pulses over time. For example, FIGS. 9A, 9B, and 9C show plots 900, 902, 904 showing example changes in a filter representation over time. Plot 900 shows the filter representation for a first time period, plot 902 shows the filter representation for a second time period, and plot 904 shows the filter representation for a third time period. The horizontal axes of the plots 900, 902, 904 represent time, and the vertical axes represent the value of the filter. A comparison of plot 902 to plot 900 shows that the third pulse has experienced a shift to the right along with a change in its magnitude, while the first pulse (at time $\tau_1$) and the second pulse (at time $\tau_2$) are substantially unperturbed. A comparison of plot 904 to the plot 902 shows that the second pulse has experienced a shift to the left, while the first pulse (at time $\tau_1$) is unperturbed and the third pulse has returned to time $\tau_3$. The finer (e.g., higher) temporal resolution of the MIMO field-based channel response can detect the shifts in the third pulse (at time $\tau_3$) without aliasing artifacts, thus allowing an inference that an object commenced motion at scatterer 710B and is moving from the scatterer 710B to the scatterer 710A.

Although the Legacy PHY-based channel responses have smaller time windows and coarser (e.g., lower) temporal resolution than the MIMO field-based channel responses, the Legacy PHY-based channel responses can be used to make macro-level determination of whether motion has occurred in the propagation environment. For example, motion may be detected by identifying substantial changes over time in the coefficients and pulse times of the Legacy PHY-based channel responses.

Figure 10:
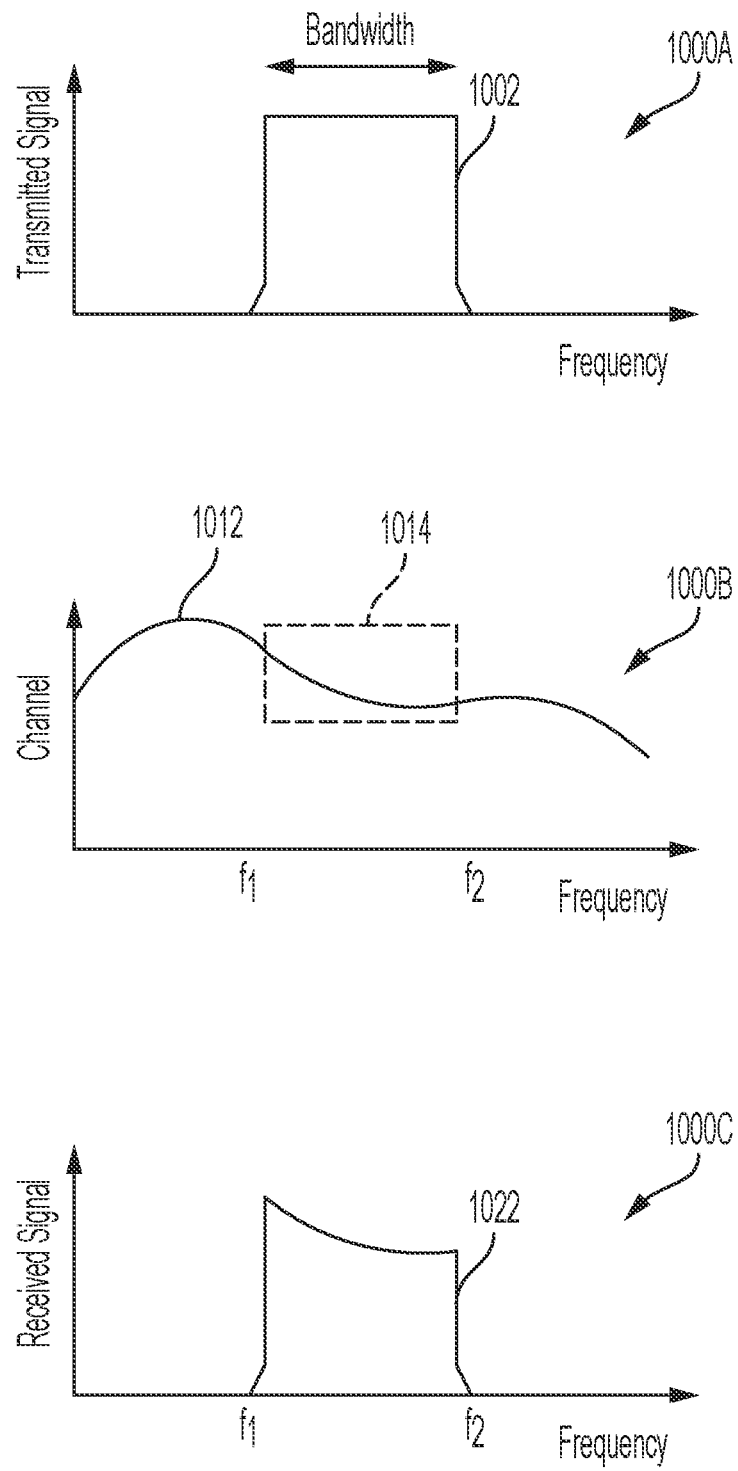
FIG. 10 is a series of plots showing a relationship between transmitted and received signals in a wireless communication system.

FIG. 10 is a series of plots 1000A, 1000B, 1000C showing a relationship between transmitted and received signals in a wireless communication system. The first plot 1000A represents an example of a transmitted OFDM signal 1002 in the frequency domain. The transmitted OFDM signal contains a number of sub-carriers at different frequencies in the bandwidth shown in FIG. 10.

The OFDM signal 1002 shown in FIG. 10 may include a PHY frame that includes one or more MIMO training fields. For example, the OFDM signal 1002 may include any of the example MIMO training fields shown in FIGS. 3 and 4 or other types of MIMO training fields. In some instances, one or more MIMO training fields in the OFDM signal 1002 can be used for motion detection.

The transmitted OFDM signal 1002 passes through a propagation environment (e.g., from the wireless communication device 702A to the wireless communication device 702B in FIG. 7), which may be represented as a channel between the transmitter and the receiver. The second plot 1000B in FIG. 10 shows an example frequency-domain representation of a channel 1012. The channel may be represented as a superposition of sinusoids, for example, as shown in Equation (7) above.

The propagation environment transforms the transmitted OFDM signal 1002 and its components (e.g., MIMO training fields and other components) to form the received OFDM signal 1022. The effect of the propagation environment on the wireless signal may be represented as the channel multiplied by the signal (both in the frequency domain), which produces the received OFDM signal at the receiver. The third plot 1000C represents the received OFDM signal 1022 in the frequency domain. Thus, the received OFDM signal 1022 represents the transmitted OFDM signal 1002 as modified by the channel 1012.

As shown in FIG. 10, only a portion 1014 of the channel 1012 is sampled by the system. This portion 1014 of the channel 1012 may be referred to as a channel response or (e.g., in WiFi standards and related literature) as channel state information (CSI), which may be isolated during a sounding process in certain systems. In some cases, the CSI can be converted into a time domain, physical response (e.g., as represented in Equation (6)) to provide a time domain representation (e.g., a set of $\tau_k$ and $\alpha_k$ values) of the channel. The measured portion of the channel response may be in contiguous or non-contiguous spectral regions. For example, the WiFi 6 standard (IEEE 802.11 ax) includes two or more separate spectral regions (e.g., as shown in FIG. 6).

Figure 11:
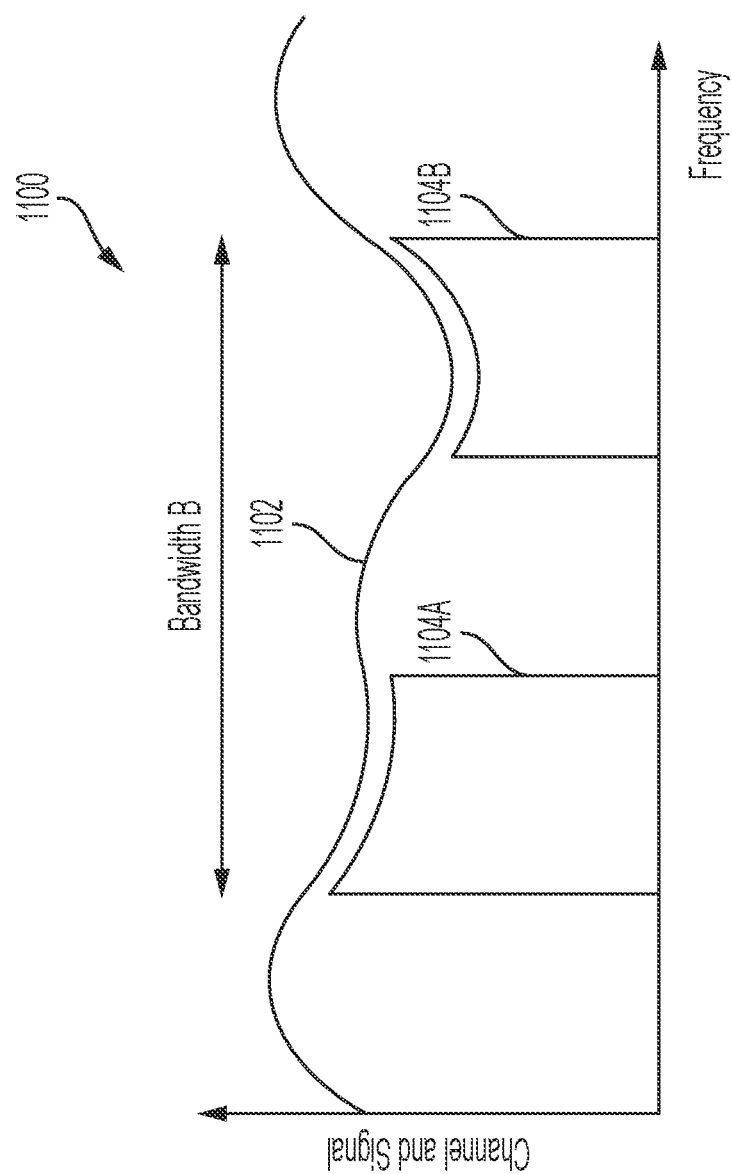
FIG. 11 is a plot showing example channel and signal information in a wireless communication system.

FIG. 11 is a plot 1100 showing example channel and signal information in a wireless communication system. In the plot 1100, the horizontal axis represents the frequency domain, and the vertical axis represents the value of the channel 1102 and the bands 1104A, 1104B of the received wireless signal. As shown in FIG. 11, the received signal includes a first band 1104A and a second band 1104B that collectively extend over the bandwidth (B). The first band 1104A covers a first frequency domain and samples a corresponding first section of the channel 1102, and the second band 1104B covers a second, different frequency domain and samples a corresponding second, different section of the channel 1102.

In some cases, a time-domain representation of the channel 1102 sampled by the bands 1104A, 1104B of the received wireless signal can be constructed (e.g., by applying a Fast Fourier Transform to the frequency-domain representation). The time-domain representation may include a number of pulses at times $\tau_k$, for example, in the format represented in Equation (6) and FIG. 8. The minimum time separation between the pulses (between the values of $\tau_k$) is generally given by $\tau_{min}=1/B$. As such, the time-resolution of the time-domain representation is a function of B, the overall bandwidth of the transmitted wireless signal. Accordingly, wireless communication standards that expand the overall bandwidth of the wireless signals may also reduce (i.e., improve) the minimum separation between pulses in the time-domain representation, leading to a more fine-grained physical model of the propagation environment. For example, due to separation of two closely spaced paths, more precise motion inferences can be made based on the channel changes.

In some implementations, an optimization process may be used to convert any number of sampled frequency bands, and convert them to a pulse-based model (e.g., time-domain representation shown in Equation (6)). The process may be formulated as the following optimization problem:

$$\tau'_k s = \underset{\tau_k's}{\operatorname{argmin}} \sum_f (\alpha_k e^{-j2\pi f \tau_k} - H(f))^2 \qquad (8)$$

The minimization problem in Equation (8) seeks to identify K paths through the channel, in which $\tau_k$ is the delay of path k, such that the response of the resulting time domain pulses matches the observed frequency response of the channel. The minimization operator seeks to minimize the difference between (1) the frequency response using a certain set of $\tau_k$'S and (2) the measured frequency response. In general, any suitable optimization methodology can be used to minimize the difference using a set of $\tau_k$'S. Once the optimization is complete, the output is a set of $\tau_k$'S values. These values are the delays of pulses that allow the time domain response to best match the observed frequency domain response.

Accordingly, solving the optimization problem in Equation (8) corresponds to finding the pulse times $\tau_k'$ which would minimize the residual of this set of equations, for all frequencies over which the channel response has been sampled. This is a nonlinear optimization problem because these equations are a nonlinear function of the pulse times $\tau_k$ despite being a linear function of the coefficients $\alpha_k$. In some cases, this optimization problem is solved by an iterative greedy process, such as, for example, stage-wise least squares. For example, a matrix equations may be formulated as follows:

$$[e^{-j2\pi f_l \tau_k}][\alpha]=H(f_l)$$

Here, the matrix is created by sweeping the values of the pulse times over the rows and sweeping the values of the frequencies over the columns. The value $f_l$ in this case represents a vector of all frequencies over which the channel response has been observed for a given signal. A column from the matrix that is maximally correlated with the output $H(f_l)$ may be selected, and the coefficients $\alpha_k$ corresponding to that can be found. The result can then be subtracted from the output $H(f_l)$ and the process can be repeated to provide K columns (each corresponding to a pulse at time $\tau_k$) and K coefficients. In some cases, the value of K can be estimated a priori based on the dynamic range of the radio receiver, and hence the amount of noise in the CSI estimate. In some cases, the value of K can be estimated based on the studies of indoor environments which restrict the number of distinct pulses that can be observed in a typical environment. For instance, the free space propagation loss, combined with limited radio dynamic range, may restrict the number of pulses observable through a radio, to less than ten in some environments. In such environments, the stage-wise least squares operation can be iterated until some other predetermined, small integer number of values for the pulse times $\tau_k$ and coefficients $\alpha_k$ have been extracted. In some cases, some of the values could be zero or negligibly small.

Figure 12:
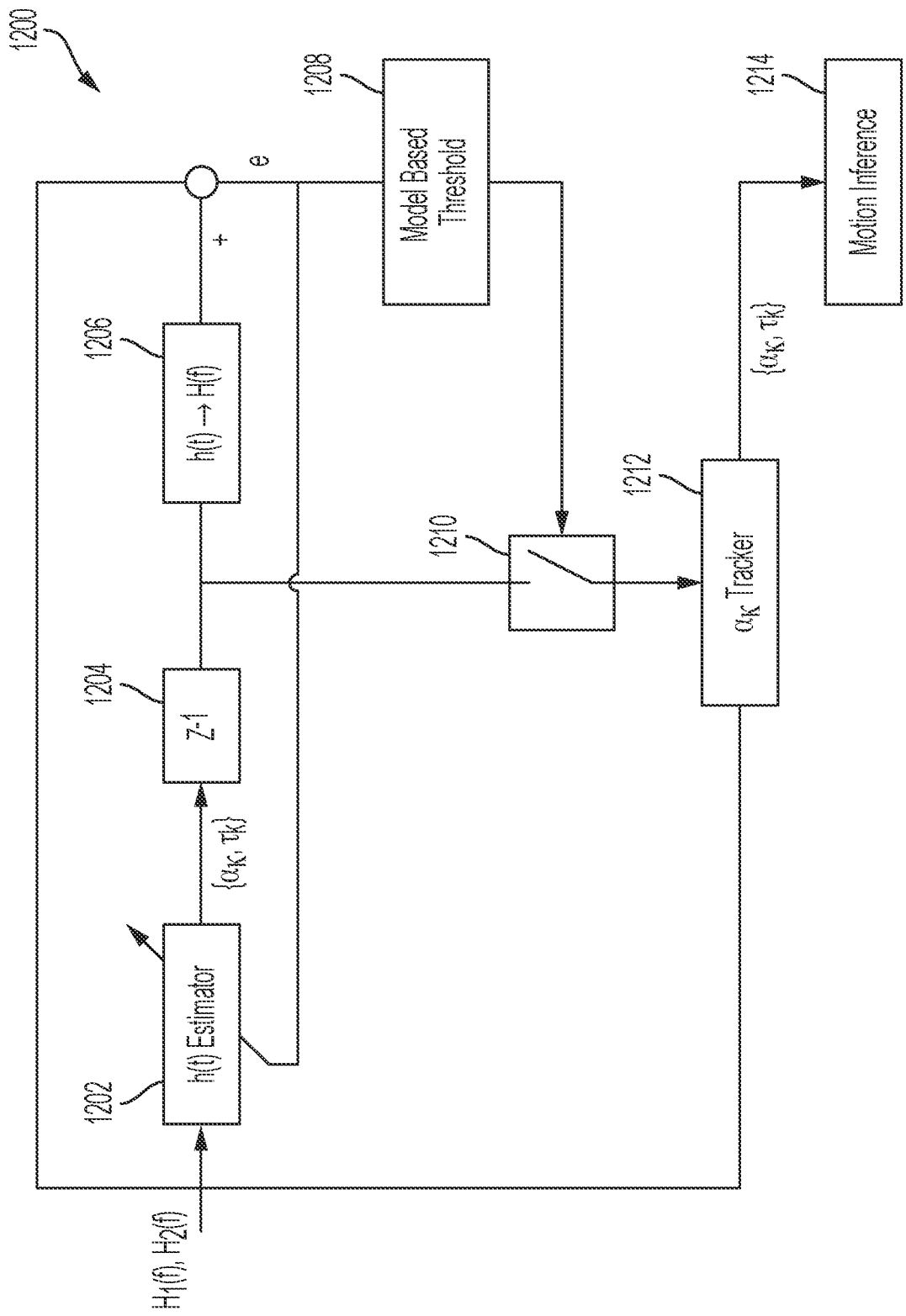
FIG. 12 is a schematic diagram of an example signal processing system for a motion detection system.

FIG. 12 is a schematic diagram of an example signal processing system 1200 for a motion detection system. The example signal processing system 1200 may implement an algorithmic state machine that performs the optimization process described above. The example signal processing system 1200 includes a channel (h(t)) estimator block 1202, a delay ($z^{-1}$) operator 1204, a Fourier transform block 1206, a model-based threshold 1208, a latch 1210, a coefficient tracker 1212 and a motion inference engine 1214. The signal processing system 1200 may include additional or different features, and may operate as shown in FIG. 12 or in another manner.

As shown in FIG. 12, a first frequency response $H_1(f)$ and a second frequency response $H_2(f)$ are received (e.g., at a wireless communication device) over a set of frequencies. The first frequency response $H_1(f)$ may be obtained based on frequency domain signals included in the Legacy PHY field of the wireless signals, and the second frequency response $H_2(f)$ may be obtained based on frequency domain signals included in the MIMO training field (e.g., HE-LTF, VHT-LTF, HT-LTF) of the received wireless. In some cases, the wireless communication device that receives the wireless signal uses the Legacy PHY and MIMO training fields to compute the magnitude and phase of each individual subcarrier obtained as a result of the wireless transmission. The magnitude and phase of each subcarrier can be represented as a complex value in $H_1(f)$ and $H_2(f)$ over a range of frequencies, with each complex value corresponding to an individual symbol or subcarrier in the training filed.

Each of the frequency responses $H_1(f)$ and $H_2(f)$ is provided to the h(t) estimator block 1202, which generates respective time-domain channel estimates $h_1(t)$ and $h_2(t)$. In some implementations, the h(t) estimator block 1202 generates the time-domain channel estimates $h_1(t)$ and $h_2(t)$ based on the optimization expressed in Equation (8). Each of the time-domain channel estimates $h_1(t)$ and $h_2(t)$ can be represented as pulses having coefficients $\alpha_k$ at pulse times $\tau_k$ (e.g., as seen in plot 800 in FIG. 8). The last calculation of the pulses is held by the latch 1210, which is controlled by the $z^{-1}$ operator 1204. In the example signal processing system 1200 shown in FIG. 12, the latch 1210 is used to hold the time domain signature of the channel, and the $z^{-1}$ operator represents one sample delay. Generally, a $z^{-N}$ operator can be used to hold the $N^{th}$ past value, and the integer N can be selected to control how quickly the dynamics of the changing environment are adjusted.

The Fourier transform block 1206 then transforms the estimated time-domain representations $h_1(t)$ and $h_2(t)$ to respective estimated frequency-domain representations $\widehat{H_1}(f)$ and $\widehat{H_2}(f)$ by applying a Fourier transform. An error value is then computed based on a difference between the estimated frequency-domain representation and the respective received frequency response. For example, the error value between received frequency response $H_1(f)$ and the estimated frequency-domain representation $\widehat{H_1}(f)$ can be computed based on the difference between $\widehat{H_1}(f)$ and $H_1(f)$. Similarly, the error value between received frequency response $H_2(f)$ and the estimated frequency-domain representation $\widehat{H_2}(f)$ can be computed based on the difference between $\widehat{H_2}(f)$ and $H_2(f)$. This process loop can be iterated until the error value has been reduced to a sufficiently low value.

The error value is provided to the model-based threshold block 1208. The threshold block 1208 determines (e.g., based on the radio dynamic range, the free space propagation loss, and potentially other factors) what is an appropriate threshold for the system to have converged to a baseline model for the pulse times $\tau_k$. Once converged, the threshold detector closes the latch 1210 (e.g., by outputting a certain value that causes the latch 1210 to close), which allows the detected coefficients $\alpha_k$ and associated pulse times $\tau_k$ to move to the coefficient tracking block 1212. The coefficient tracking block 1212 takes the estimated frequency-domain representations $H_1(f)$ and $H_2(f)$ at each time step, and recomputes the coefficients $\alpha_k$ to ensure that the channel model is tracked sufficiently closely. In some implementations, when a large-scale changes happen in the propagation environment, the error loop is triggered again for a fresh computation of coefficients $\alpha_k$ and pulse times $\tau_k$, which are then propagated to the coefficient tracker 1212. The output of the tracker 1212, representing the reflected pulses, and their corresponding complex multiplier coefficients is given to the motion inference engine 1214 to detect motion characteristics. For example, the motion inference engine 1214 may identify motion of an object in a space by analyzing changes in the coefficients $\alpha_k$ and pulse times $\tau_k$ over time. As discussed above, changes in the Legacy PHY-based channel responses may be used to make a macro-level determination of whether motion has occurred, while changes in the MIMO field-based channel responses may be used to make a finer-grained determination of motion (e.g., the location of motion, the direction of both, or both).

As shown in FIG. 12, the latch 1210 serves as a computational tool, to store the last computed values of coefficients $\alpha_k$ and associated pulse times $\tau_k$ to drive the error loop. In some aspects of operation, each time a new frequency response is received, a previous set of pulses (stored in the latch 1210) are transformed through Fourier transform (at 1216) into the frequency response and compared with the newly arrived channel response. This loop may ensure that large scale changes in the channel are handled by continuously adapting the pulse time calculator. For example, when macro changes happen in the environment, a new response that is better aligned with the new environment can be calculated. If a significant change in the response is not detected, the same set of $\tau_k$ values continues to be used to model the multipath of the channel. When a significant change is detected, a new set of $\tau_k$ values is computed. In some cases, computation of coefficients $\alpha_k$ and associated pulse times $\tau_k$ is a more computationally-intensive operation than the computation of only coefficients $\alpha_k$. Therefore, the example signal processing system 1200 is programmed to compute pulse times $\tau_k$ only when significant changes are detected, while computing coefficients $\alpha_k$ for each new signal received. This may help track the power of the received multipath over time and reveal information, for example, whether a path has become obstructed.

Figure 13:
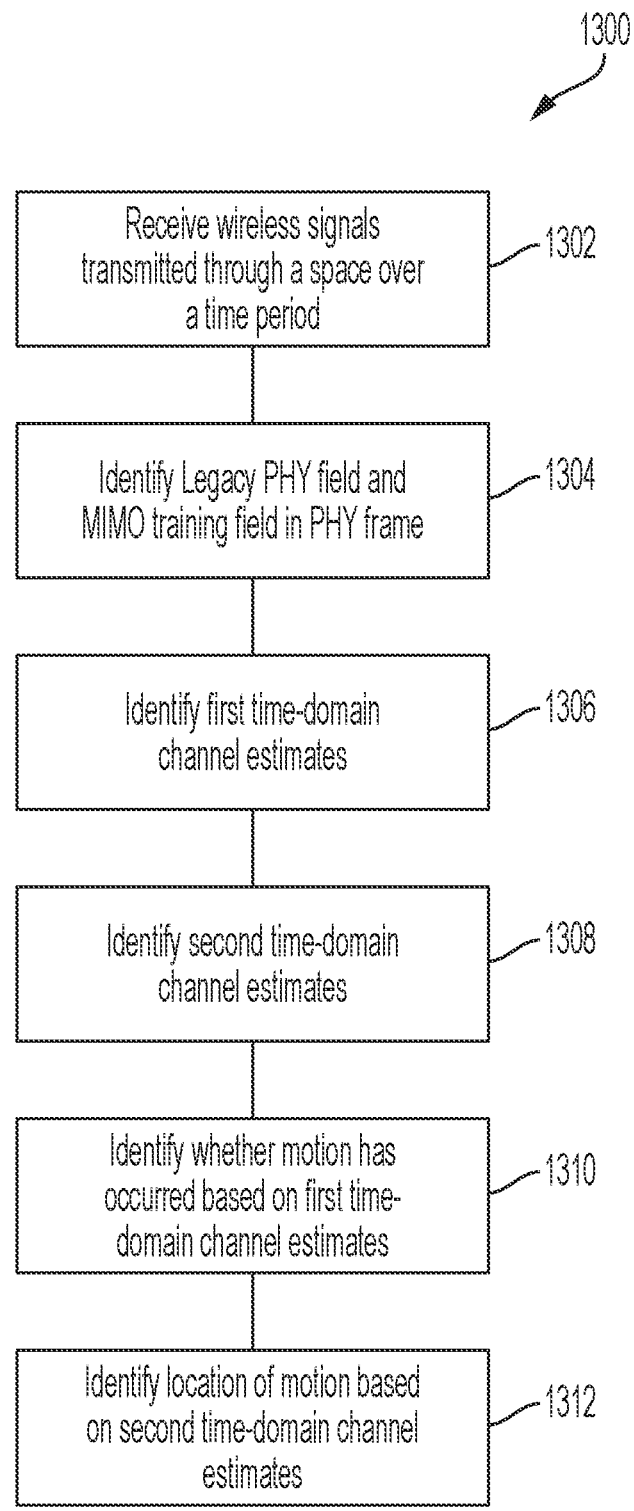
FIG. 13 is a flowchart showing a motion detection process.

FIG. 13 is a flowchart showing a motion detection process 1300. The process 1300 may include additional or different operations, and the operations shown in FIG. 13 may be performed in the order shown or in another order. In some cases, one or more of the operations shown in FIG. 13 are implemented as processes that include multiple operations, sub-processes for other types of routines. In some cases, operations can be combined, performed in another order, performed in parallel, iterated or otherwise repeated or performed in another manner. The process 1300 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232) shown in FIG. 2C, or by another type of device.

At 1302, wireless signals that are transmitted through a space (e.g., the spaces 200, 201) over a time period are received. The wireless signals may be transmitted between the example wireless communication devices 102A, 102B, 102C shown in FIG. 1, the example wireless communication devices 204A, 204B, 204C shown in FIGS. 2A and 2B, between any of the example devices 226, 228, 232 shown in FIG. 2C, or another type of wireless communication device.

Each of the wireless signals may be formatted according to a wireless communication standard. In some instances, the wireless signals may be formatted according to the IEEE 802.11 standard and may include a PHY frame, examples being the example PHY frame 300 shown in FIG. 3, the example PHY frame 400 shown in FIG. 4, or another type of PHY frame from a wireless signal.

At 1304, a Legacy PHY field (e.g., L-STF and L-LTF) and a MIMO training field (e.g., HE-LTF, HT-LTF, or VHT-LTF) are identified in the PHY frame of each of the wireless signals. A first frequency-domain signal (e.g., $H_1(f)$) may be included in the Legacy PHY field, and a second frequency-domain signal (e.g., $H_2(f)$) may be included in the MIMO training field. At 1306, a first time-domain channel estimate (e.g., $h_1(t)$) is generated based on the first frequency-domain signal, and at 1308, a second time-domain channel estimate (e.g., $h_2(t)$) is generated based on the second frequency-domain signal. Since the continuous frequency bandwidth of the MIMO training field is greater than the continuous frequency bandwidth of the Legacy PHY field, the temporal resolution of the first time-domain channel estimate is coarser than the temporal resolution of the second time-domain channel estimate. Stated differently, the temporal resolution of the first time-domain channel estimate is lower than the temporal resolution of the second time-domain channel estimate.

At 1310, a determination is made whether motion has occurred in the space based on the first time-domain channel estimate (e.g., $h_1(t)$). In some instances, the determination at 1310 is a macro-level indication of whether motion has occurred in the space. At 1312, a location of motion within the space is determined based on the second time-domain channel estimate (e.g., $h_2(t)$). In some instances, the determination at 1312 is finer-grained motion data that allows a motion detection system to localize motion within the space and to, in some instances, determine a direction of motion within the space (e.g., as illustrated in FIGS. 9A, 9B, 9C).

Figure 14:
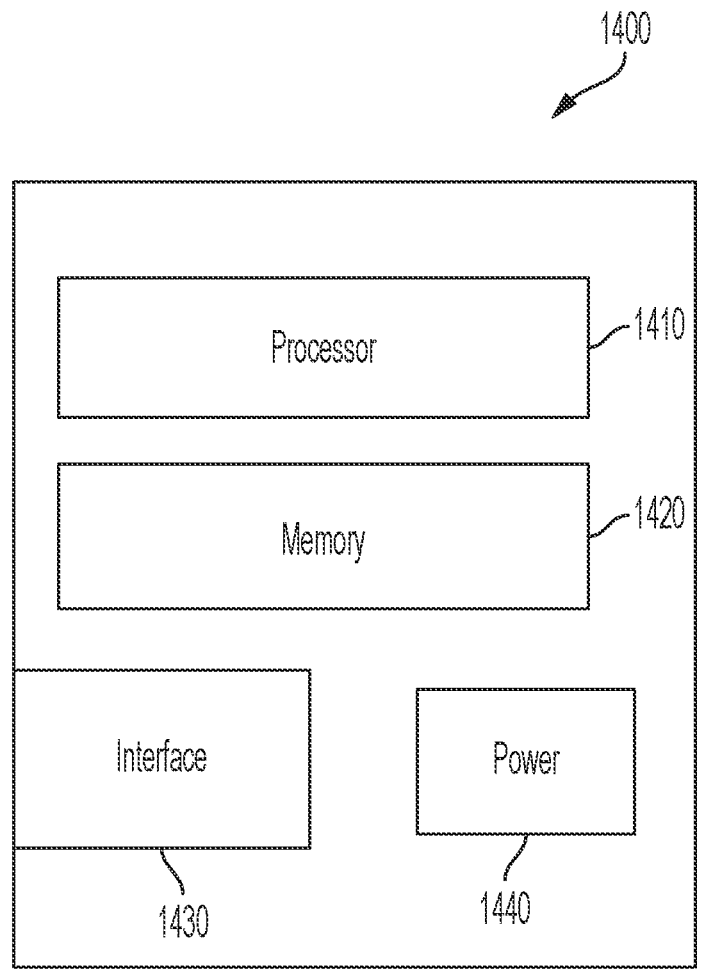
FIG. 14 is a block diagram showing an example wireless communication device.

FIG. 14 is a block diagram showing an example wireless communication device 1400. As shown in FIG. 14, the example wireless communication device 1400 includes an interface 1430, a processor 1410, a memory 1420, and a power unit 1440. A wireless communication device (e.g., any of the wireless communication devices 102A, 102B, 102C in FIG. 1) may include additional or different components, and the wireless communication device 1400 may be configured to operate as described with respect to the examples above. In some implementations, the interface 1430, processor 1410, memory 1420, and power unit 1440 of a wireless communication device are housed together in a common housing or other assembly. In some implementations, one or more of the components of a wireless communication device can be housed separately, for example, in a separate housing or other assembly.

The example interface 1430 can communicate (receive, transmit, or both) wireless signals. For example, the interface 1430 may be configured to communicate radio frequency (RF) signals formatted according to a wireless communication standard (e.g., Wi-Fi, 4G, 5G, Bluetooth, etc.). In some implementations, the example interface 1430 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 1410 can execute instructions, for example, to generate output data based on data inputs. The instructions can include programs, codes, scripts, modules, or other types of data stored in memory 1420. Additionally or alternatively, the instructions can be encoded as pre-programmed or re-programmable logic circuits, logic gates, or other types of hardware or firmware components or modules. The processor 1410 may be or include a general-purpose microprocessor, as a specialized co-processor or another type of data processing apparatus. In some cases, the processor 1410 performs high level operation of the wireless communication device 1400. For example, the processor 1410 may be configured to execute or interpret software, scripts, programs, functions, executables, or other instructions stored in the memory 1420. In some implementations, the processor 1410 be included in the interface 1430 or another component of the wireless communication device 1400.

The example memory 1420 may include computer-readable storage media, for example, a volatile memory device, a non-volatile memory device, or both. The memory 1420 may include one or more read-only memory devices, random-access memory devices, buffer memory devices, or a combination of these and other types of memory devices. In some instances, one or more components of the memory can be integrated or otherwise associated with another component of the wireless communication device 1400. The memory 1420 may store instructions that are executable by the processor 1410. For example, the instructions may include instructions to perform one or more of the operations described above.

The example power unit 1440 provides power to the other components of the wireless communication device 1400. For example, the other components may operate based on electrical power provided by the power unit 1440 through a voltage bus or other connection. In some implementations, the power unit 1440 includes a battery or a battery system, for example, a rechargeable battery. In some implementations, the power unit 1440 includes an adapter (e.g., an AC adapter) that receives an external power signal (from an external source) and coverts the external power signal to an internal power signal conditioned for a component of the wireless communication device 1400. The power unit 1420 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and αkeyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, one or more fields in a PHY frame are used for motion detection.

In a general example, wireless signals are transmitted over a time period from a first wireless communication device, through a space, to a second wireless communication device. The wireless signals are formatted according to a wireless communication standard, and each wireless signal includes a PHY frame according to the standard. A MIMO training field (e.g., HE-LTF, HT-LTF, or VHT-LTF) is identified in the PHY frame of each wireless signal. Channel responses are generated based on the respective MIMO training fields. The channel responses are used to detect motion (e.g., motion of an object) that occurred in the space during the time period.

Implementations of the general example may include one or more of the following features. The wireless communication standard is a standard for multiple-input-multiple-output (MIMO) radio communications, a MIMO training field is identified in the PHY frame of each wireless signal, and the channel responses are generated based on the respective MIMO training fields. The wireless communication standard is the IEEE 802.11ax standard. The channel responses are used to detect the location of the motion that occurred in the space during the time period. The channel responses may be analyzed in a time-domain representation, for example, to detect motion or the location of a moving object.

In a first example, wireless signals that are transmitted through a space over a time period are received. The wireless signals may be transmitted between wireless communication devices in a wireless communication network and can be formatted according to a wireless communication standard. A first training field and a second, different training field are identified in an orthogonal frequency-division multiplexing (OFDM)-based PHY frame of each wireless signal. A first time-domain channel estimate and a second time-domain channel estimate are generated for each wireless signal. The first time-domain channel estimate may be based on a first frequency-domain signal included in the first training field of the wireless signal, while the second time-domain channel estimate may be based on a second frequency-domain signal included in the second training field of the wireless signal. In some instances, the temporal resolution of the first time-domain channel estimate is coarser (e.g., lower) than a temporal resolution of the second time-domain channel estimate. A determination is made whether motion has occurred in the space during the time period based on the first time-domain channel estimates, and a location of the motion within the space is determined based on the second time-domain channel estimates.

Implementations of the first example may include one or more of the following features. Determining the location of the motion within the space can include determining a direction of the motion within the space based on the second time-domain channel estimates. A frequency resolution of the first frequency-domain signal may be coarser (e.g., lower) than a frequency resolution of the second frequency-domain signal. The first training field can include a legacy training field of the OFDM-based PHY frame, and the second training field can include a multiple-input-multiple-output (MIMO) training field of the OFDM-based PHY frame. The MIMO training field can include a high-efficiency long training field (HE-LTF). The MIMO training field can include a very high throughput long training field (VHT-LTF). The MIMO training field can include a high throughput long training field (HT-LTF). The wireless communication standard can be the IEEE 802.11 standard. The wireless communication network can be a wireless local area network (WLAN).

In a second example, a non-transitory computer-readable medium stores instructions that are operable when executed by data processing apparatus to perform one or more operations of the first example. In a third example, a system includes a plurality of wireless communication devices, and a computer device configured to perform one or more operations of the first example.

Implementations of the third example may include one or more of the following features. One of the wireless communication devices can be or include the computer device. The computer device can be located remote from the wireless communication devices.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the description above.

What is claimed is:

1. A method, comprising:
receiving wireless signals transmitted through a space over a time period, wherein the wireless signals are transmitted between wireless communication devices in a wireless communication network and are formatted according to a wireless communication standard;
identifying a first frequency-domain signal included in a first training field in an orthogonal frequency-division multiplexing (OFDM)-based PHY frame of each wireless signal, wherein the OFDM-based PHY frame of each wireless signal comprises a second, different training field comprising a second frequency-domain signal;
generating, for each wireless signal, a first time-domain channel estimate based on the first frequency-domain signal included in the first training field of the wireless signal, wherein a temporal resolution of the first time-domain channel estimate is higher than a temporal resolution of a second time-domain channel estimate based on the second frequency-domain signal;
determining whether motion has occurred in the space during the time period based on the first time-domain channel estimates; and
providing, based on the determination of whether motion has occurred, a notification for graphical display on a user device.

2. The method of claim 1, wherein providing the notification comprises communicating the notification to a user device of a designated caregiver or emergency contact associated with a person in the space.

3. The method of claim 1, wherein the wireless communication devices comprise a client device, and the motion is detected by operation of motion detection software on the client device.

4. The method of claim 1, comprising:
providing, based on the determination of whether motion has occurred, motion data for graphical display on the user device, the motion data indicating a degree of motion detected in the space for each time point in a series of time points.

5. The method of claim 4, wherein the motion data further indicates a relative degree of motion detected by each wireless communication device in the wireless communication network.

6. The method of claim 1, wherein the first training field is a multiple-input-multiple-output (MIMO) training field of the OFDM-based PHY frame.

7. The method of claim 6, wherein the second training field is a legacy training field of the OFDM based PHY frame, and wherein a frequency resolution of the first frequency-domain signal is higher than a frequency resolution of the second frequency-domain signal.

8. The method of claim 6, wherein the MIMO training field includes beamforming state information.

9. The method of claim 6, wherein the MIMO training field includes a high-efficiency long training field (HE-LTF).

10. The method of claim 6, wherein the MIMO training field includes a very high throughput long training field (VHT-LTF).

11. The method of claim 6, wherein the MIMO training field includes a high throughput long training field (HT-LTF).

12. A non-transitory computer-readable medium comprising instructions that are operable, when executed by data processing apparatus, to perform operations comprising:
receiving wireless signals transmitted through a space over a time period, wherein the wireless signals are transmitted between wireless communication devices in a wireless communication network and are formatted according to a wireless communication standard;
identifying a first frequency-domain signal included in a first training field in an orthogonal frequency-division multiplexing (OFDM)-based PHY frame of each wireless signal, wherein the OFDM-based PHY frame of each wireless signal comprises a second, different training field comprising a second frequency-domain signal;
generating, for each wireless signal, a first time-domain channel estimate based on the first frequency-domain signal included in the first training field of the wireless signal, wherein a temporal resolution of the first time-domain channel estimate is higher than a temporal resolution of a second time-domain channel estimate based on the second frequency-domain signal;
determining whether motion has occurred in the space during the time period based on the first time-domain channel estimates; and
providing, based on the determination of whether motion has occurred, a notification for graphical display on a user device.

13. The non-transitory computer-readable medium of claim 12, wherein providing the notification comprises communicating the notification to a user device of a designated caregiver or emergency contact associated with a person in the space.

14. The non-transitory computer-readable medium of claim 12, wherein the wireless communication devices comprise a client device, and the motion is detected by operation of motion detection software on the client device.

15. The non-transitory computer-readable medium of claim 12, comprising:
providing, based on the determination of whether motion has occurred, motion data for graphical display on the user device, the motion data indicating a degree of motion detected in the space for each time point in a series of time points.

16. The non-transitory computer-readable medium of claim 15, wherein the motion data further indicates a relative degree of motion detected by each wireless communication device in the wireless communication network.

17. The non-transitory computer-readable medium of claim 12, wherein the first training field is a multiple-input-multiple-output (MIMO) training field of the OFDM-based PHY frame.

18. The non-transitory computer-readable medium of claim 17, wherein the second training field is a legacy training field of the OFDM-based PHY frame, and wherein a frequency resolution of the first frequency-domain signal is higher than a frequency resolution of the second frequency-domain signal.

19. The non-transitory computer-readable medium of claim 17, wherein the MIMO training field includes beamforming state information.

20. The non-transitory computer-readable medium of claim 17, wherein the MIMO training field includes a high-efficiency long training field (HE-LTF).

21. A system comprising:
a plurality of wireless communication devices in a wireless communication network, the plurality of wireless communication devices configured to transmit wireless signals, formatted according to a wireless communication standard, through a space over a time period; and
a computer device comprising one or more processors operable to perform operations comprising:
identifying a first frequency-domain signal included in a first training field in an orthogonal frequency-division multiplexing (OFDM)-based PHY frame of each wireless signal, wherein the OFDM-based PHY frame of each wireless signal comprises a second, different training field comprising a second frequency-domain signal;
generating, for each wireless signal, a first time-domain channel estimate based on the first frequency-domain signal included in the first training field of the wireless signal, wherein a temporal resolution of the first time-domain channel estimate is higher than a temporal resolution of a second time-domain channel estimate based on the second frequency-domain signal;
determining whether motion has occurred in the space during the time period based on the first time-domain channel estimates; and
providing, based on the determination of whether motion has occurred, a notification for graphical display on a user device.

22. The system of claim 21, wherein providing the notification comprises communicating the notification to a user device of a designated caregiver or emergency contact associated with a person in the space.

23. The system of claim 21, wherein the wireless communication devices comprise a client device, and the motion is detected by operation of motion detection software on the client device.

24. The system of claim 21, comprising:
providing, based on the determination of whether motion has occurred, motion data for graphical display on the user device, the motion data indicating a degree of motion detected in the space for each time point in a series of time points.

25. The system of claim 24, wherein the motion data further indicates a relative degree of motion detected by each wireless communication device in the wireless communication network.

26. The system of claim 21, wherein the first training field is a multiple-input-multiple-output (MIMO) training field of the OFDM-based PHY frame.

27. The system of claim 26, wherein the second training field is a legacy training field of the OFDM based PHY frame, and wherein a frequency resolution of the first frequency-domain signal is higher than a frequency resolution of the second frequency-domain signal.

28. The system of claim 26, wherein the MIMO training field includes beamforming state information.

29. The system of claim 26, wherein the MIMO training field includes a high-efficiency long training field (HE-LTF).

* * * * *